United States Patent [19]

Waibel et al.

[11] Patent Number: 5,855,000

[45] Date of Patent: *Dec. 29, 1998

[54] METHOD AND APPARATUS FOR CORRECTING AND REPAIRING MACHINE-TRANSCRIBED INPUT USING INDEPENDENT OR CROSS-MODAL SECONDARY INPUT

[75] Inventors: Alexander Waibel; Bernhard Suhm; Arthur McNair, all of Pittsburgh, Pa.

[73] Assignee: Carnegie Mellon University, Pittsburgh, Pa.

[*] Notice: The term of this patent shall not extend beyond the expiration date of Pat. No. 5,712,957.

[21] Appl. No.: 724,420

[22] Filed: Oct. 1, 1996

Related U.S. Application Data

[63] Continuation-in-part of Ser. No. 525,921, Sep. 8, 1995, Pat. No. 5,712,957.

[51] Int. Cl.⁶ .............................. G10L 9/18; G06K 9/03
[52] U.S. Cl. .................. 704/235; 704/236; 704/255; 382/186
[58] Field of Search ................. 704/239, 240, 704/252, 257, 235, 236, 255; 382/186

[56] References Cited

U.S. PATENT DOCUMENTS

| | | | |
|---|---|---|---|
| 3,969,700 | 7/1976 | Bollinger et al. | 382/231 |
| 4,520,499 | 5/1985 | Montlick et al. | 704/266 |
| 4,829,572 | 5/1989 | Kong | 704/249 |
| 4,829,576 | 5/1989 | Porter | 704/235 |
| 4,831,653 | 5/1989 | Katayama | 704/235 |
| 4,914,704 | 4/1990 | Cole et al. | 704/235 |
| 4,980,917 | 12/1990 | Hutchins | 704/254 |
| 5,027,406 | 6/1991 | Roberts et al. | 704/244 |
| 5,127,055 | 6/1992 | Larkey | 704/244 |
| 5,208,897 | 5/1993 | Hutchins | 704/200 |
| 5,241,619 | 8/1993 | Schwartz et al. | 704/200 |
| 5,386,494 | 1/1995 | White | 704/275 |
| 5,428,707 | 6/1995 | Gould et al. | 704/231 |
| 5,500,920 | 3/1996 | Kupiec | 704/270 |
| 5,502,774 | 3/1996 | Bellegarda et al. | 382/159 |
| 5,579,436 | 11/1996 | Wu Chow et al. | 704/244 |
| 5,619,708 | 4/1997 | Ho | 707/506 |
| 5,621,809 | 4/1997 | Bellegarda et al. | 382/116 |
| 5,638,425 | 6/1997 | Meador, III et al. | 379/88 |

OTHER PUBLICATIONS

Bernhard Suhm, Brad Myers, and Alex Waibel, "Interactive Recovery from Speech Recognition Errors in Speech User Interfaces," Proc. Fourth International Conference on Spoken Language Processing, ICSLP 96. Oct. 1996.

Eric K. Ringger and James F. Allen, "Error Correction via a Post–Processor for Continuous Speech Recognition", Proc. ICASSP 96, 427–430. May 1996.

Hermann Hild and Alex Waibel (Stephen José Hanson ed., 1993), Connected Letter Recognition with a Multi–State Time Delay Neural Network, Neural Information Processing System 5, 1993, published by Morgan Kaufmann, S.F. California.

O. Schmidbauer et al., An LVQ Based Reference Model For Speaker–Adaptive Speech Recognition, IEEE Proceedings of the International Conference on Acoustics, Speech, and Signal Processing, Mar. 1992, Pittsburgh, PA.

W.A. Ainsworth et al., Feedback Strategies For Error Correction In Speech Recognition Systems, Int. J. Man–Machine Studies (1992) 36, 833–842, Staffordshire, UK.

*Primary Examiner*—David D. Knepper
*Assistant Examiner*—Tālivaldis Ivars Šmits
*Attorney, Agent, or Firm*—Kirkpatrick & Lockhart & LLP

[57] ABSTRACT

The method of the present invention is comprised of the steps of locating an error within a recognition hypothesis. A repair hypothesis is generated for the located error from a secondary input signal. At least a portion of the recognition hypothesis is correlated with the repair hypothesis to produce a new hypothesis for the located error. The located error is replaced with the new hypothesis. It has been determined that when the primary and secondary input signals are cross-modal, the chances that the error will be repeated are so low that the correlation step becomes optional.

113 Claims, 11 Drawing Sheets

METHOD AND APPARATUS FOR CORRECTING AND REPAIRING MACHINE-TRANSCRIBED INPUT USING INDEPENDENT OR CROSS-MODAL SECONDARY INPUT

CROSS-REFERENCE TO RELATED APPLICATIONS

This application is a continuation-in-part of U.S. patent application Ser. No. 08/525,921, filed Sep. 8, 1995, now U.S. Pat. No. 5,712,957, issued Jan. 27, 1998.

BACKGROUND OF THE INVENTION

1. Field of the Invention

The present invention is directed generally to machine recognition of input signals representing speech, handwriting, etc., and, more particularly, to a method and apparatus for correcting and repairing input recognized by such recognition systems.

2. Description of the Invention Background

The drive to make the man-machine interface more user-friendly has lead researchers to create machines capable of understanding spoken commands. Speech recognition systems have been built which provide good results when the speech is limited to a particular list of commands, or a specialized vocabulary. Speech recognition systems typically do much worse at trying to recognize conversational English, either person to person or person to machine. That is because conversational English contains a wide variety of words, slang, and non-words such as "umm" and "uhh". Recognizing conversational English is also complicated by regional accents and poor enunciation. Finally, conversational English frequently contains numerous mistakes which typically do not impair a human listener's ability to understand the message, although such mistakes very often confuse a recognition system. Thus, the need arises to provide some mechanism to correct the speech recognized by a speech recognition system.

Based on our understanding of the various types of speech recognition systems currently sold in the marketplace, we believe that such systems may be divided into four types: recognition engines, command systems, dictation systems, and special purpose speech-driven applications.

Recognition engines are primarily software, which takes a single utterance as input, and produces a single hypothesis or n-best list as an output. No repair is provided with this type of system. Recognition engines may be either discrete-word or continuous-speech systems. With discrete-word systems, the recognizer can only recognize a single word at a time, so the user must pause between each word until the recognizer produces the output for the last word spoken.

Command-based recognition systems are generally used for single-word or few-word commands used to affect and control some system with speech. Most have a small, fixed vocabulary of between ten and one hundred commands that can be recognized in any one situation. None of the command-based systems of which we are aware has any kind of repair mechanism for repairing incorrect recognition. Instead, because there is a finite number of commands from which to chose at any given time, the system attempts to avoid incorrect recognitions by looking at a confidence score for each recognition. If the confidence score is below a predetermined threshold, the system will do nothing, and the user must repeat the command again and again until the score is above the threshold.

Dictation recognition systems must handle a very large vocabulary, up to tens of thousands of possible words, because they are used for dictating text of various kinds. All of the commercially available dictation systems of which we are aware are discrete-word systems. For such systems, the repair mechanisms are designed to repair only a single word at a time, and usually just the last word that has been spoken. If a recognition error occurred before the last word, the user must say "backup", or some other key word, which indicates that there was an error. The recognition system then goes into a repair mode for that word where the user can select the correct word by selecting an alternate word from a presented list of alternatives, or typing in the correct word.

There are also commercially available special purpose speech-driven applications. We have seen such applications developed for particular fields such as the medical and legal field. Such special-purpose applications may be set up to generate medical reports or complete legal forms. In such systems, continuous speech is allowed, but the possible variations of sentences that can be spoken is very limited. Because such systems recognize a whole utterance at a time, repair is performed by indicating an error, or not indicating that it was correctly recognized, and simply respeaking the whole utterance until it is recognized correctly.

In addition to the above-mentioned commercial systems, there are also several research systems under development. Such systems are typically built to handle a particular task, such as scheduling a meeting (Carnegie Mellon University's JANUS system), obtaining airline information (U. S. Government sponsored ATIS Task), or obtaining information about a city (MIT's Voyager System). These systems are continuous speech systems which use an understanding component to extract the meaning from the text output by a speech recognizer. Such systems sometimes incorporate another type of repair mechanism not used in the commercially available systems, namely the method of initiating a directed disambiguation dialogue. The understanding component expects sentences to contain certain pieces of information. If one of those pieces is missing, due to a recognition error or due to the user simply leaving the information out, the understanding component will ask the user to repeat the missing piece of information. The question and answer dialogue will continue until the understanding component is satisfied that it has all the information.

Most current research in speech recognition focuses on the continuing improvement of large-vocabulary speech recognition accuracy. While great improvements have been made in recent years, no recognition algorithms or systems have been created which eliminate the possibility of recognition errors. If large vocabulary speech recognizers are going to be used for any tasks where exact recognition is critical, then the inevitable errors need to be eliminated in some way that is acceptable to the users of the system. That means that a user interface must be designed to allow the user to correct recognition errors.

Another type of recognition system is directed to recognizing handwriting as typified by the Newton product available from Apple Computers, Inc.

The simplest error correction interface is to force the user to respeak or rewrite the whole utterance numerous times until the recognizer identifies the proper words. That interface may be easy to design and build, but it meets with very low user acceptance due to the fact that the greater user investment of time does not lead to a greater likelihood of the error being corrected. That is because every time the misrecognized word is repeated, it is treated as an independent event. Thus, if a person has an accent or an unusual manner of saying a particular word, or a strange manner of writing a certain letter, the repair system, because it continually treats each repeat as an independent event unrelated to all of the previous events, might never identify the proper word.

Another interface design is to force the user to edit the recognized text with a keyboard or mouse-based editor. Though this method may guarantee correction of the errors, it requires the user to switch input modalities to accomplish a single task, and also eliminates many of the hands-free, eyes-free benefits of a speech interface. Thus the need exists for a repair interface which allows the user to repair misrecognitions in a way that is as natural and effective as possible under a given set of conditions.

SUMMARY OF THE INVENTION

The present invention solves the foregoing problems by providing a method and apparatus for repairing the output of a recognition engine. One embodiment of the present invention contemplates correlating a recognition hypothesis produced from a primary input signal with a repair hypothesis produced from a secondary input signal. The primary and secondary input signals may be of different modalities (eg. speech and nonverbal spelling, speech and verbal spelling, writing and speech, etc.) (referred to herein as "crossmodal") or may be of the same modality (speech and respeaking, writing and rewriting, etc.). The correlation may take one of several forms. For example, the correlation may be a rescoring of n-best lists or lattices or an exploitation of the context in which the material to be repaired appears.

The method of the present invention is comprised of the steps of locating an error within a recognition hypothesis. A repair hypothesis is generated for the located error from a secondary input signal. At least a portion of the recognition hypothesis is correlated with the repair hypothesis to produce a new hypothesis for the located error. The located error is replaced with the new hypothesis.

It has been determined that when the primary and secondary input signals are cross-modal, the chances that the error will be repeated are so low that the correlation step becomes optional. Thus, according to another embodiment of the present invention, the primary and secondary input signals are constrained to be cross-modal and performance of the correlation step becomes optional.

The present invention enables an incorrectly recognized primary input signal to be corrected through a secondary input signal which is independent of the primary input signal, although it is not treated as such. For example, the recognition system may be constrained by knowledge of past incorrect hypotheses such that those incorrect hypotheses are not selected again. When the secondary input signal is cross-modal to the primary input signal, the chances are improved that the recognition of the primary input signal will be corrected because the secondary input signal represents an event of a different kind such that the failure which occurred in recognizing the primary input signal is unlikely to be repeated. Recognition errors can be identified automatically or may be identified manually through some type of pointing device, such as a mouse, touch screen, light pen, or any other such device, or optionally by keyboard. Errors can also be automatically located by speaking a portion of the recognition hypothesis that contains an error. If speech is the modality for the primary input signal, the input modality need not be changed. Those and other advantages and benefits of the present invention will be apparent from the Description of a Preferred Embodiment hereinbelow.

BRIEF DESCRIPTION OF THE DRAWINGS

For the present invention to be clearly understood and readily practiced, the present invention will be described in conjunction with the following figures wherein.

DESCRIPTION OF A PREFERRED EMBODIMENT

Figure 1:
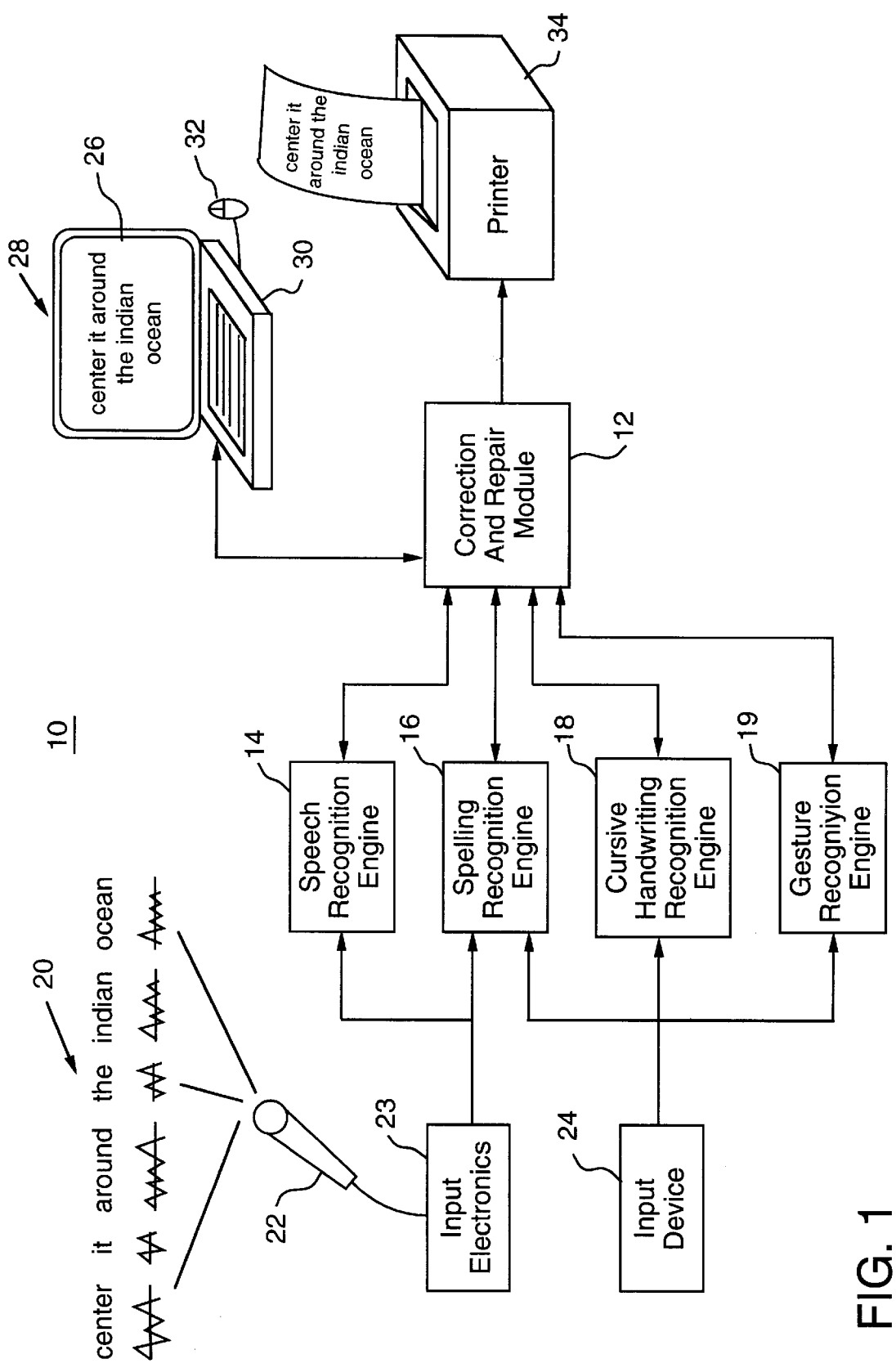
FIG. 1 is a block diagram illustrating a speech recognition system having a correction and repair module constructed according to the teachings of the present invention.

FIG. 1 is a block diagram illustrating a recognition system 10 having a correction and repair module 12 constructed according to the teachings of the present invention. The recognition system 10 includes a commercially available speech recognition engine 14. The speech recognition engine 14 may be a continuous recognizer which can switch language models quickly. The recognition engine 14 may be of the type which outputs a segmented, scored, n-best list and/or word lattice. In our work, we have used an HMM continuous speech recognizer. Other types of speech recognition engines 14 which may be used include continuous speech recognizers developed at research labs engaging in speech recognition such as BBN, IBM Corporation, Dragon, SRI, AT&T, or at other universities such as MIT. In addition, the present invention can be applied in a similar way using a recognizer for disconnected speech instead of continuous speech, which disconnected speech recognizers are already commercially available, for example, by Dragon, Inc. (Mass.), IBM Corporation, and Philipps Corporation (Germany). The system 10 also includes a spelling recognition engine 16. For spelling, we used an MSTDNN-based continuous spelling recognizer.

In the preferred embodiment, both recognition engines 14 and 16 use the same input format, which simplifies their use in one common interface, although that is not required to practice the present invention. The speech recognition engine 14 may use any type of language model, for example, the widely used trigram language model may be used to constrain the hypothesis search. The spelling recognition engine 16 may be either a continuous speech recognizer adapted to the task of connected letter recognition, or a dedicated connected letter recognizer of the type described in "Speaker-Independent Connected Letter Recognition With A Multi-State Time Delay Neural Network", 3rd European Conference on Speech, Communication and Technology (EUROSPEECH 93), Berlin, Germany, September 1993, Volume 2, pp. 1481–1484.

A third recognition engine 18 may be any suitable type of recognition engine such as a cursive handwriting recognition engine of the type described in Manke, St. et al., "NPen++: A Writer Independent, Large Vocabulary On-Line Cursive Handwriting Recognition System", Proceedings of the International Conference on Document Analysis and Recognition, Montreal, Canada, August 1995; Styarner, T. et al., "On-Line cursive handwriting recognition using speech recognition methods", Proceedings of ICASSP '94, IEEE International Conference on Acoustics, Speech and Signal Processing, Adalide, Australia, 19–22 Apr. 94; or Nathan, K. S. et al., "Real-time On-line unconstrained handwriting recognition using statistical methods", Proceedings of 1995 International Conference On Acoustics, Speech, and Signal Processing, Detroit, Mich., 9–12 May 1995 or used in Apple Inc.'s Newton product.

A fourth recognition engine 19 may be any suitable type of gesture recognition engine of the type described in Mardia, K. V. et al., "Techniques for online GESTURE recognition on workstations", Image Vis. Comput., UK; Vol. 11, no. 5, June 1993, pp. 283–94 or Rubine, D., "The Automatic Recognition of Gestures" Ph.D. Thesis, Carnegie Mellon University, 1993.

The speech recognition engine 14 receives audio input, referred to as a primary utterance and generally designated 20, through a microphone 22 and input electronics 23 in a known manner. The primary utterance 20 is one type of primary input signal. Other types of primary input signals could include handwriting, verbal spelling, cursive spelling, gestures, etc. The output of the speech recognition engine 14 is input to the correction and repair module 12, the details of which will be described hereinbelow. Feedback is provided from the correction and repair module 12 to the speech recognition engine 14 for the purpose of correcting and repairing the speech recognized by speech recognition engine 14 when the mode of correction is to respeak the incorrect word or words. The spelling recognition engine 16 cooperates with the correction and repair module 12 when the mode of correction is to spell the incorrect word or words.

The third and fourth recognition engines 18, 19, respectively, receive input from an appropriate input device 24. Input device 24 may be a touch sensitive pad or any other input transducer appropriate for recognition engines 18, 19. The third recognition engine 18 cooperates with the correction and repair module 12 when the mode of correction is to write the correct word or words. Similarly, the fourth recognition engine 19 cooperates with the correction and repair module 12 when the mode of correction is through gestures.

The output of the correction and repair module 12 may be displayed on a screen 26 of a computer 28. The computer 28 may be provided with standard input devices such as keyboard 30 and pointing device such as mouse 32. The correction and repair module 12 may be responsive to corrections input through the keyboard 30, use of the mouse 32 or other pointing device to highlight words on screen 26, or to other known input techniques such as a touch sensitive screen. The output of the correction and repair module 12 may also be input to a printer 34 which provides a printed copy of the recognized primary input signal. The operation of the system shown if FIG. 1 is described in detail in conjunction with FIG. 3 hereinbelow.

Before an error can be corrected, the error must be located. That location can be determined, for example, by using the mouse 32 to highlight errors. Alternatively, errors can be located by the user touching erroneous words displayed on a touch screen. To provide visual feedback to the user, the "touched" errors can be highlighted. A method of automatically locating errors is next described in conjunction with FIG. 2.

Figure 2:
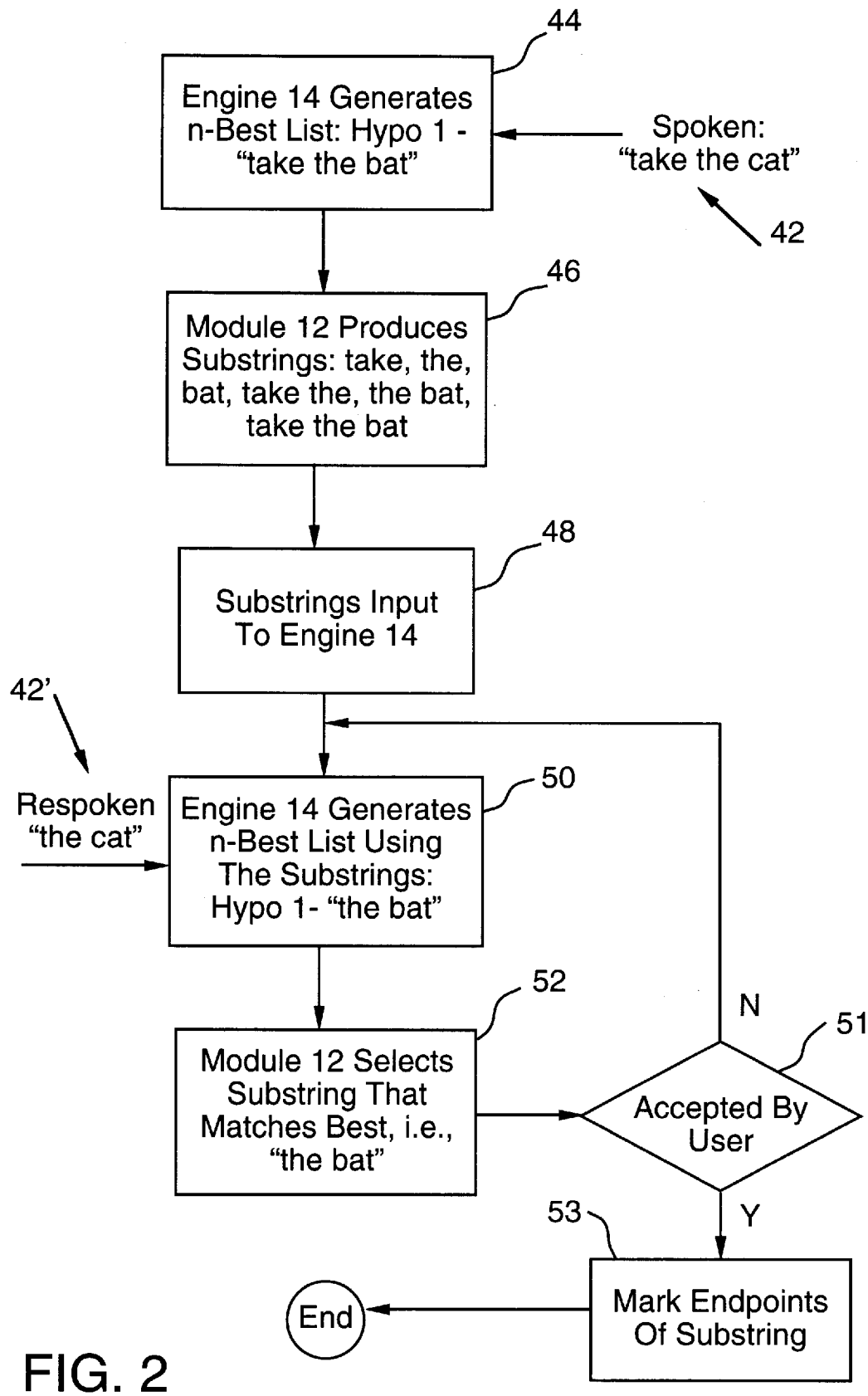
FIG. 2 is a flow chart illustrating the steps of one method performed by the speech recognition system illustrated in FIG. 1 of automatically locating a subpiece for purposes of repairing the subpiece.

This technique is used when a primary utterance 42 in FIG. 2 has been spoken and the hypothesis output at step 44 by speech recognition engine 14 contains an error. One of the necessary pieces of information to repair an error is the location of that error in the primary utterance 42. That location could be determined, for example, with the use of the mouse 32 highlighting an errorful subsection of the recognition. In FIG. 2, which is directed to a process called automatic subpiece location, we describe how to accomplish that highlighting by voice only, requiring the user to respeak only the errorful subsection of the primary utterance 42.

Given that the user will respeak some unknown subsection of the primary utterance 42, a language model is created in step 46 by the correction and repair module 12 by identifying all substrings of the first hypothesis of the primary recognition. Those substrings are then input at step 48 to speech recognition engine 14. A secondary utterance (a respeaking of a subpiece of the primary utterance) 42' is then run through the speech recognition engine 14 at step 50 which uses the newly constructed language model. That will produce a secondary n-best list of possible choices for the respoken subpiece 42'. Each hypothesis in the secondary n-best list (from best to worst) is evaluated to determine if it is a substring of the first hypothesis of the primary recognition at step 52. The best match is presented to the user at step 51, and if accepted by the user, the endpoints of that substring are returned as the location of the respoken subpiece at step 53 and the evaluation stops. If the best match does not result in, for example, the incorrect words being highlighted, the process is repeated beginning with step 50.

Figure 3:
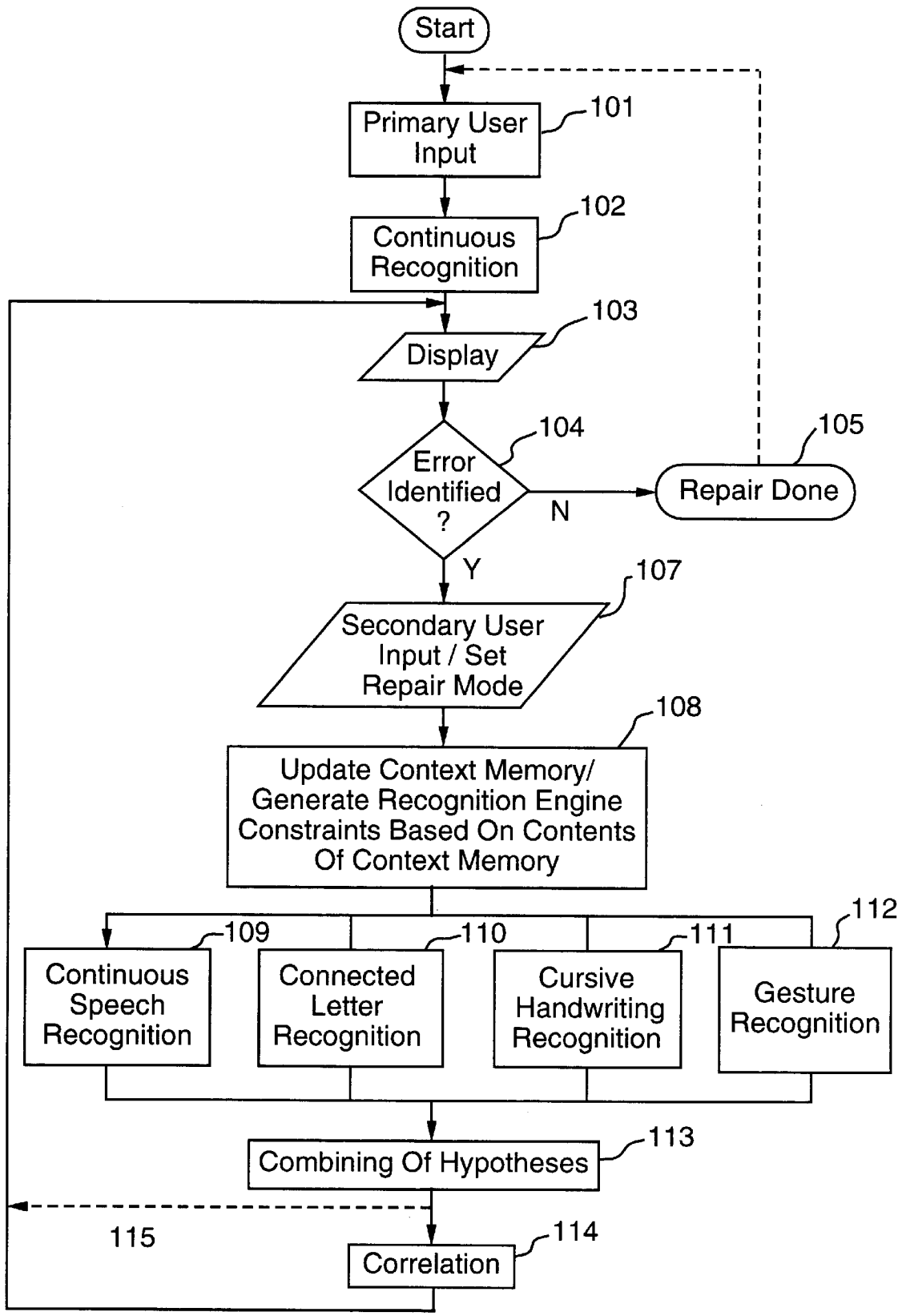
FIG. 3 is a block diagram illustrating the operation of the method of the present invention.

FIG. 3 is a block diagram illustrating the operation of the method of present invention. In FIG. 3, a primary input signal is received from the user at step 101. One of the recognition engines 14, 16, 18, 19 of FIG. 1 operates at step 102 to produce a recognition hypothesis. It is anticipated that the most likely modes of operation at step 102 will be speech recognition (i.e., engine 14) and cursive handwriting recognition (i.e., engine 18) to produce the recognition hypothesis from the primary input signal. The recognition hypothesis is displayed at step 103 and accepted or rejected at decision step 104. The hypothesis is rejected when the user proceeds to identify or locate some error in the displayed recognition hypothesis. An error can be identified or located using one of the methods described above. If no errors are identified in the hypothesis, then either the recognition hypothesis was correct, or the repair hypothesis, to be described hereinafter, was successful, as indicated by step 105, and the method returns to step 101 to process additional primary input signals.

If errors are identified in the recognition hypothesis at step 104, the hypothesis is rejected. Thereafter, at step 107, a secondary input signal is received from the user and, based on the type of user input, a repair mode is selected. An optional context memory may be updated at step 108. The context memory may be used, for example, to constrain the recognition engines to prevent the recognition of an impossible word or phrase, e.g., a word or phrase which has already been identified as being incorrect.

Thereafter, the secondary input signal received at step 107 is input to the various recognition engines at steps 109–112 depending on the mode set at step 107. Specifically, operation of speech recognition engine 14 corresponds to step 109, operation of spelling recognition engine 16 corresponds to step 110, operation of cursive handwriting recognition engine 18 corresponds to step 111, and operation of the gesture recognition engine corresponds to step 112. Depending upon the type of secondary input signal, each of the engines 14, 16, 18, 19 may, or may not, produce a repair hypothesis.

At step 113, a combination of hypotheses is performed depending upon the number of outputs from steps 109–112. This step could be as simple as selecting one of the hypotheses output from steps 109–112 (as in the case of cross-modal repair of the type described below) or as complicated as correlating different hypotheses resulting from multiple, substantially simultaneous repair input signals.

If the primary and secondary input signals are cross-modal, the appropriate repair hypothesis is selected at step 113 and may be substituted for the identified error as shown by broken line 115. The thus modified recognition hypothesis is displayed at step 103. It has been discovered that when the secondary input signal is cross-modal with respect to the primary input signal, the chances are improved that the recognition of the primary input signal will be corrected because the secondary input signal represents an event of a different kind. Therefore, the failure which occurred during recognition of the primary input signal is unlikely to be repeated. However, if the primary and secondary input signals are not cross-modal, or if there is a desire to provide an increased likelihood of correcting the misrecognition of the primary input signal, then a correlation of the selected repair hypothesis with the recognition hypothesis may be performed at step 114.

The correlation step 114 may take several different forms depending upon the types of output produced by the recognition engines. If the recognition engine produces an n-best list or lattice, a rescoring of the n-best list resulting from the recognition hypothesis together with the n-best list produced by the repair hypothesis produces a new hypothesis. That method of correlation is described in detail in conjunction with FIGS. 9, 10, and 11. Another type of correlation includes the rescoring of an n-best list or lattice produced as a result of the repair hypothesis with information stored in the context memory about the recognition hypothesis and possibly previous repair hypothesis. Correlation can be effected by excluding words and phrases which are impossible given the current context. Alternatively, that functionality can be implemented by updating the context memory at step 108 so as to produce control signals to constrain the recognition engines 14, 16, 18, 19 to deactivate certain words. Another type of correlation includes exploiting the context of the located error. Instead of using the usual beginning of a located error, the context is set to include the words preceding the located error. For example, if the primary hypothesis is:

"I would like to meet one day around noon"
while the intended speech was:

"I would like to meet Monday around noon",
then the located error is "one day". Under this type of correlation, the secondary input is recognized using an m-gram context "I would like to meet" instead of "<s>" (generic begin of utterance symbol).

Yet another type of correlation is the correlation of a repair hypothesis with a previously generated repair hypothesis. As mentioned, however, use of the correlation step 114 and use of the context memory at step 108 is optional. It has been determined that when the primary input signal and secondary input signal are cross-modal, that the context memory step 108 and correlation step 114 are not required. A number of examples involving different types of repair are now provided.

Figure 4:
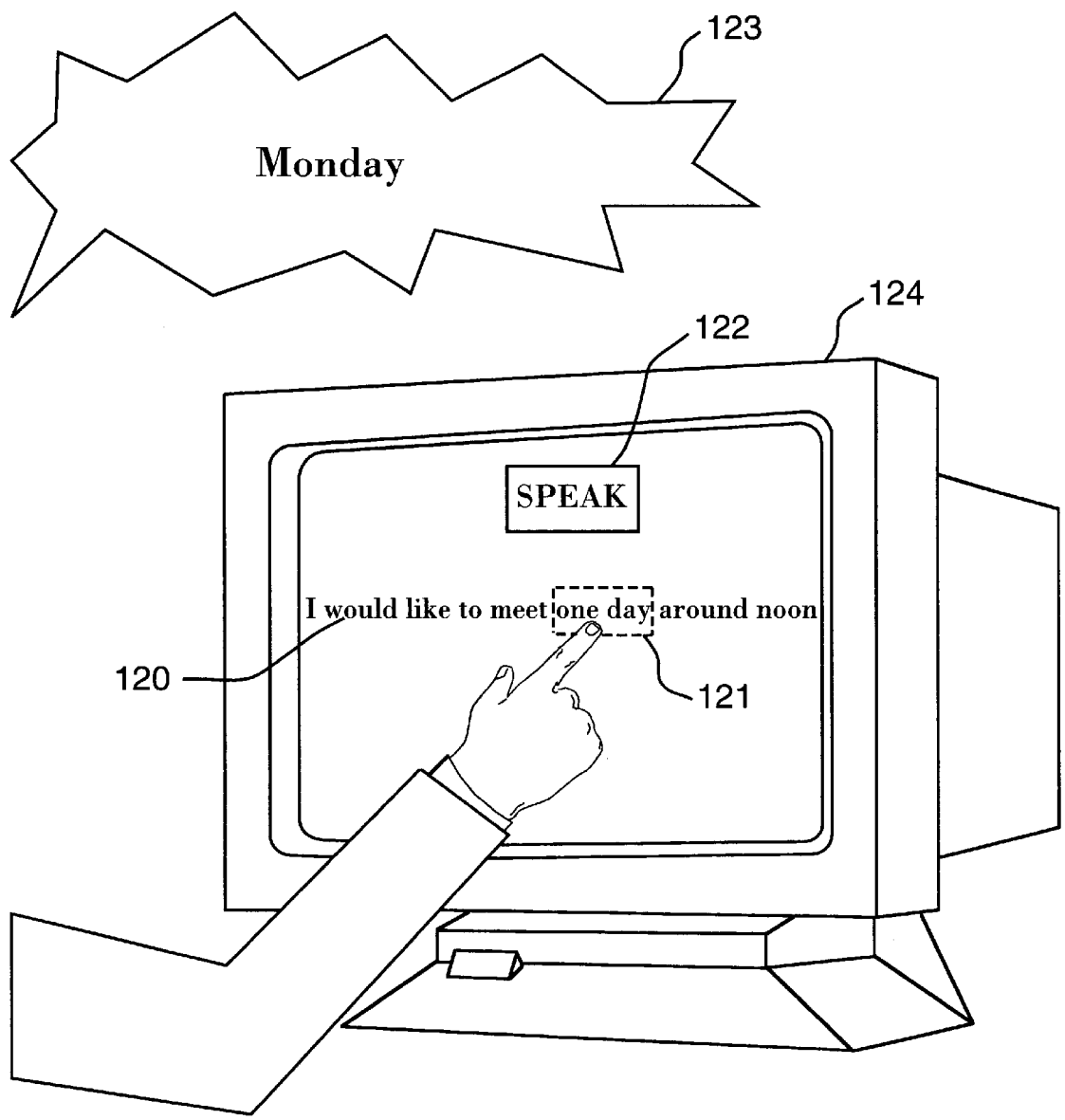
FIG. 4 illustrates how errors can be located by touching a touch sensitive display and how the repair mode may be set.

Assuming that the user is providing a primary input signal in the form of speech, then speech recognition engine 14 is providing a recognition hypothesis which is being displayed at step 103 on a terminal 124 shown in FIG. 4. Assume further that the user speaks "I would like to meet Monday around noon" while the speech recognition engine provides a recognition hypothesis 120 of "I would like to meet one day around noon". At step 104, the user rejects the hypothesis by identifying the word 121 "one day" as being in error by touching the touch sensitive screen. The user then provides a secondary input signal, which in this example is a respeaking 123 of the located error 121. The repair mode may be set in response to the respeaking to repair by speech. Alternatively, the repair mode may be set using the "button" 122. The context memory is updated with the first best hypothesis "I would like to meet one day around noon" and the information that "one day" is incorrect. Thereafter, the secondary input signal is passed to speech recognition engine 14 at step 109 and spelling recognition engine 16 at step 110. Each recognition engine generates a repair hypothesis with the speech recognition engine 14 producing the hypothesis "Monday" and the spelling recognition engine 16 producing the hypothesis "m u a".

At step 113, an automatic classification of whether the secondary input signal is continuous speech or spelling is performed and the secondary input signal classified as continuous speech. Therefore, the repair hypothesis produced by the speech recognition engine 14 at step 109 is selected. The located error "one day" of the recognition hypothesis of the primary input is replaced by the repair hypothesis thus producing "I would like to meet Monday around noon". That hypothesis is displayed at step 103 and accepted by the user at step 104 when no errors are identified.

Figure 5:
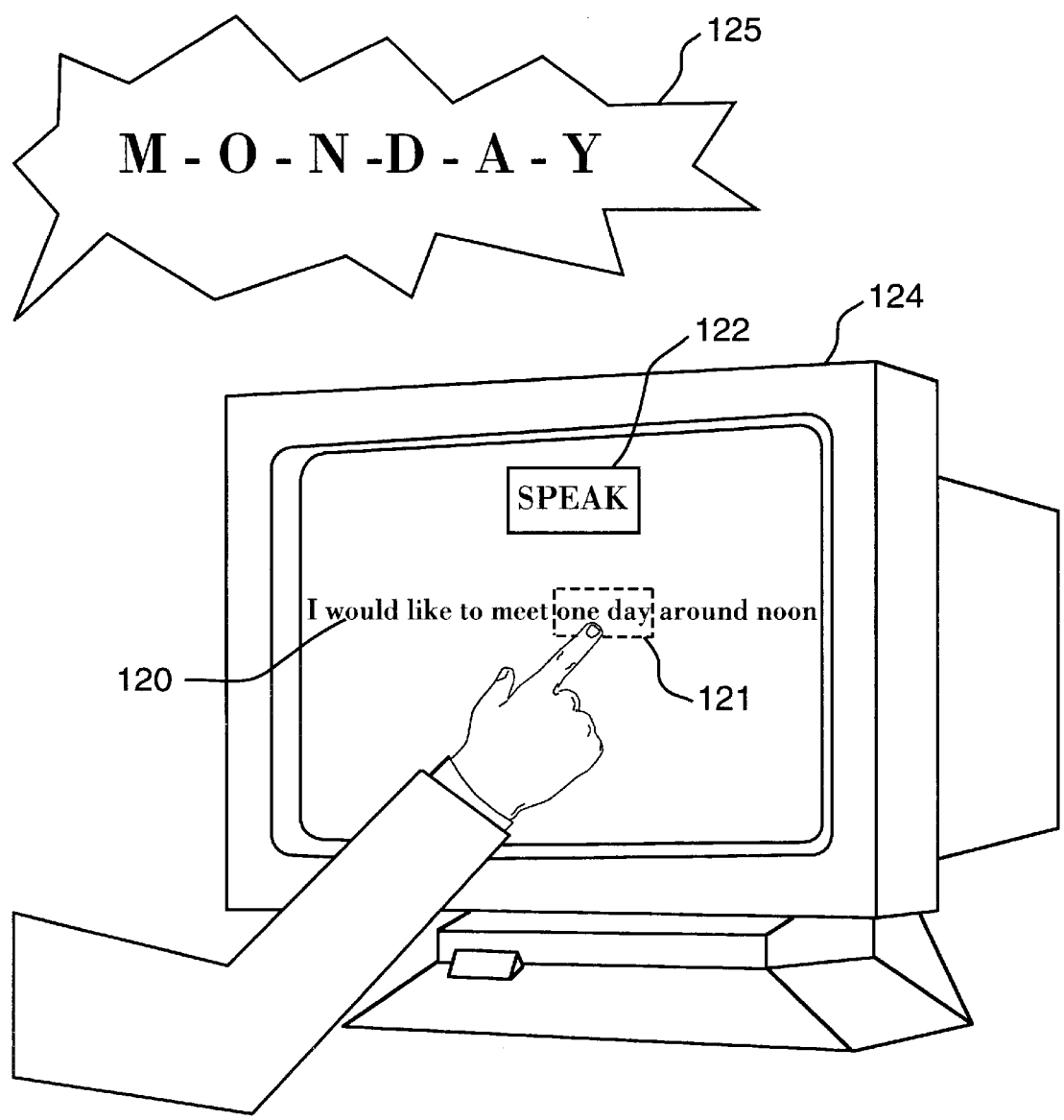
FIG. 5 is similar to FIG. 4, showing repair by spelling.

Another example of a repair performed in accordance with the method of FIG. 2 is repair of speech by spelling. In this example, speech is the primary input signal such that speech recognition engine 14 produces a recognition hypothesis at step 102 which is displayed at step 103 on display 124 in FIG. 5. At step 104, the user rejects the recognition hypothesis by highlighting the words "one day" 121 and spells aloud, as a sequence of letters 125 "m o n d a y" thereby providing the secondary input signal.

In this example, the repair mode is set to "speech" in step 107, but the context memory is not used such that step 108 is skipped. The secondary input is passed to both the speech recognition engine 14 and the spelling recognition engine 16 which produce, respectively, the following repair hypotheses "oh an the a" and "m o n d a y". At step 113, the repair hypothesis produced at step 110 is selected and used to replace the located error. Thereafter, the recognition hypothesis which has been modified to include the repair hypothesis in place of the located error is displayed to the user at step 103 and accepted at step 104.

Figure 6:
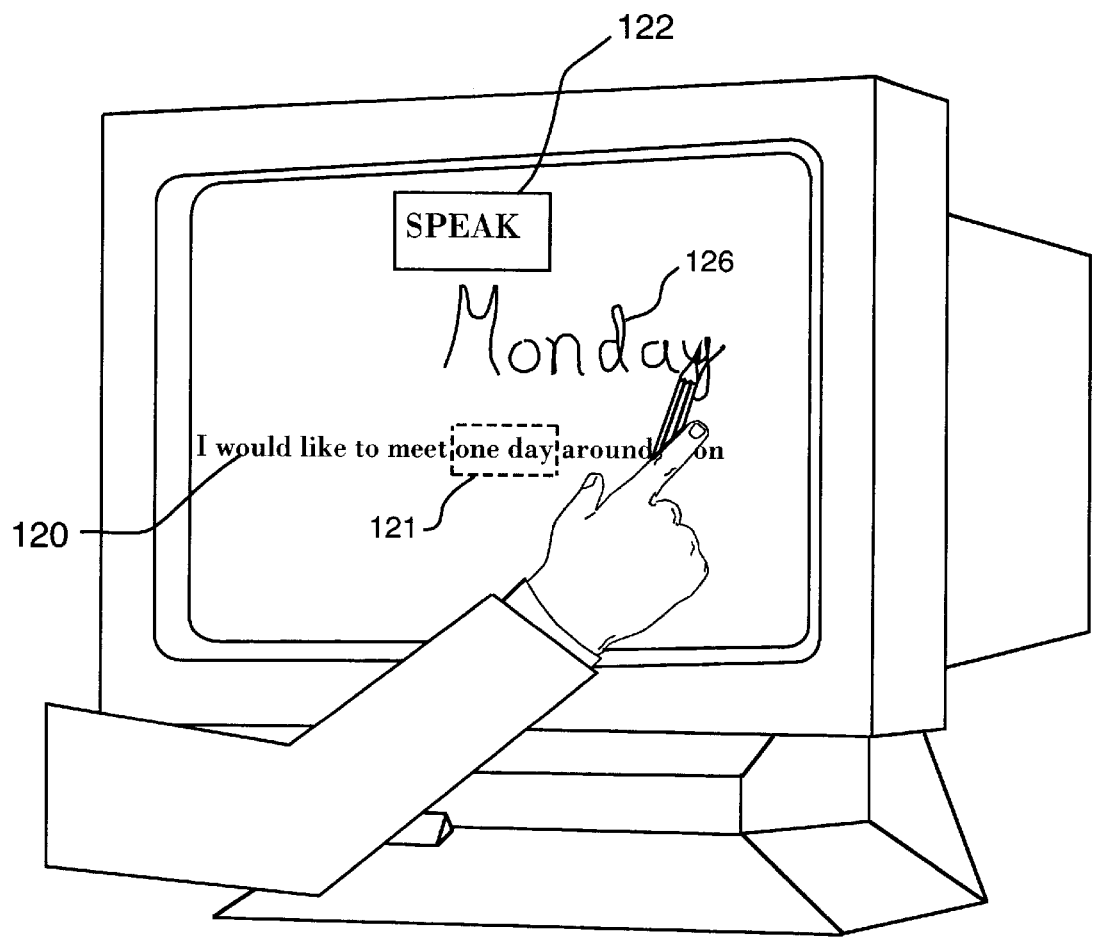
FIG. 6 is similar to FIG. 4, showing repair by handwriting.

Another example of the method set forth in FIG. 2 is the repair of speech through the use of handwriting as shown in FIG. 6. As in the other examples, the primary input signal input at step 101 is speech such that at step 102 speech recognition engine 14 produces a recognition hypothesis which is displayed at step 103 and rejected at step 104. In this example, the user rejects the highlighted words "one day" 121 and writes on touch sensitive display using input device 24 the word "Monday" 126. The writing of the word "Monday" provides the secondary input signal and, because the user used the input device 24, the repair mode is set to repair by writing or gesture. The secondary input signal is thus passed to both the cursive handwriting recognition engine 18 and the gesture recognition engine 19. The cursive handwriting recognition engine 18, at step 111, produces a hypothesis "Monday" while the gesture recognition engine 19 produces no hypothesis because there is no gesture input. Thus, at step 113, the repair hypothesis produced by the cursive handwriting recognition engine 18 is used to replace the located error and the thus modified recognition hypothesis is displayed to the user at step 103 and accepted at step 104. Note that in this example, as in the previous example, neither the context memory 108 nor the correlation step 114 were relied upon to improve the chances that the repair hypothesis was correct. That is because, as previously stated, when the secondary input signal is cross-modal with respect to the primary input signal, the additional performance provided by the context memory and correlation step 114 are not required.

Figure 7:
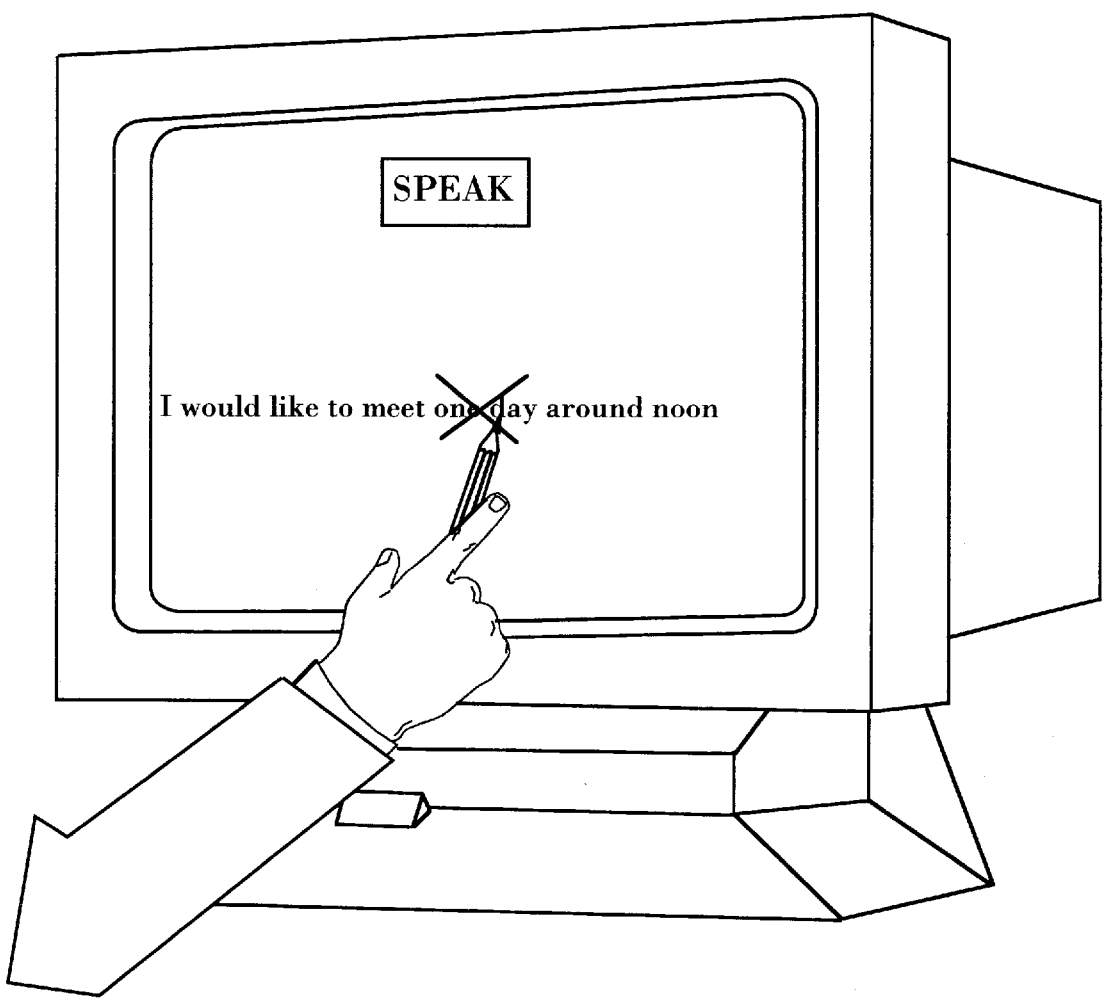
FIG. 7 is similar to FIG. 4, showing deleting by gestures.

A final example involving FIG. 2 involves the use of repair of speech to delete words with a gesture as shown in FIG. 7. As in the previous examples, speech is the primary input to the speech recognition engine 14 which produces a recognition hypothesis displayed to the user at step 103. The user rejects the displayed hypothesis by scratching out the words "one day" with an input device thus providing a secondary input signal. The located error is identified as "one day" and the repair mode is set to repair by handwriting or gesture. The secondary input signal is passed to both the cursive handwriting recognition engine 18 and the gesture recognition engine 19. The cursive handwriting recognition engine 18 at step 111 produces no meaningful hypothesis whereas the gesture recognition engine interprets the gesture as a request to delete the words "one day". The output of the gesture recognition engine 19 is selected at step 113 and the recognition hypothesis is modified to "I would like to meet around noon."

Figure 8:
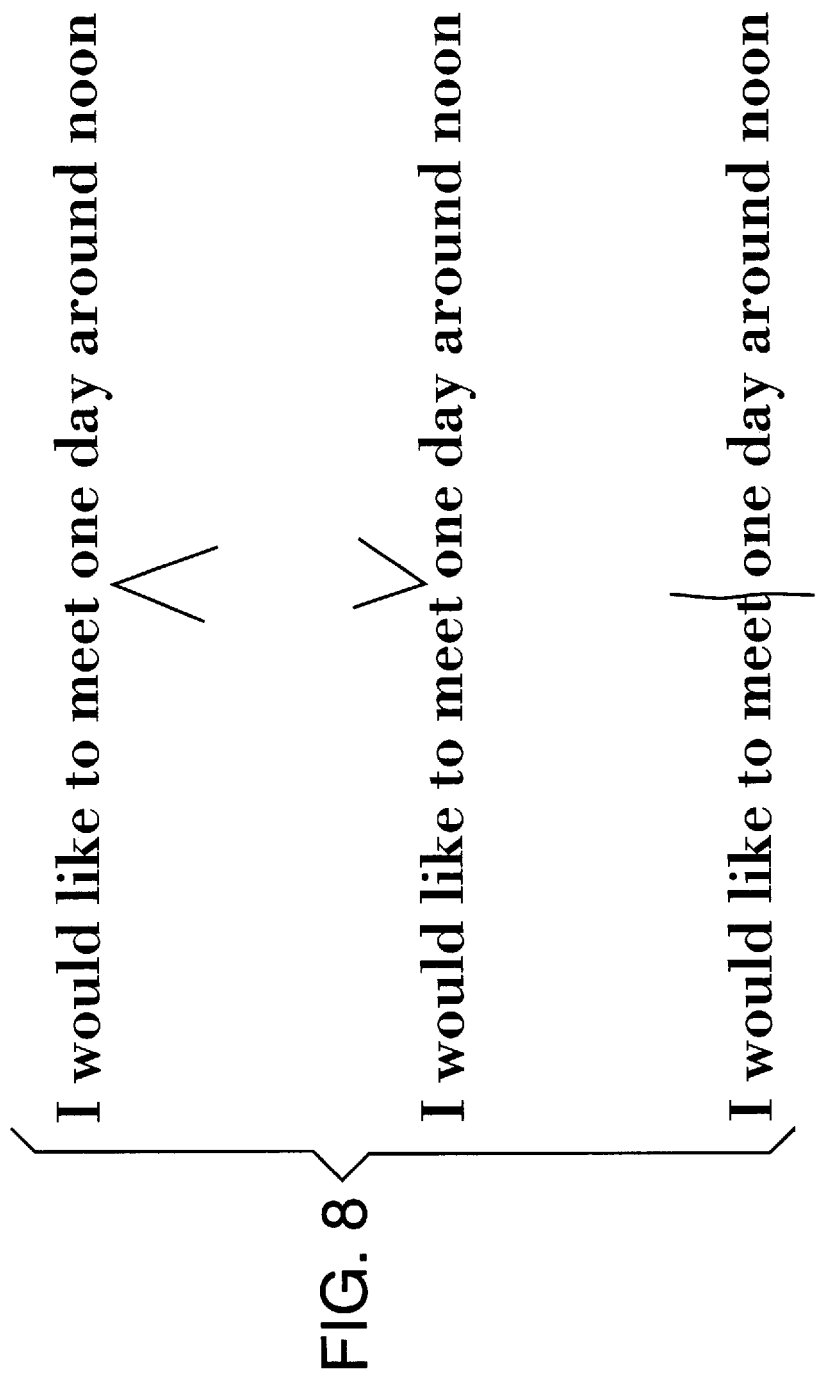
FIG. 8 illustrates various gestures interpreted to determine the position of the cursor.

In addition to repair by substituting or deleting located errors as described thus far, the preferred embodiment also allows repair by inserting words. The input signal can be of any modality such as speech, spelling, or handwriting. Gestures 130, as illustrated in FIG. 8, can be used to determine the location where to insert (or delete) material. An insertion cursor may be used to provide visual feedback to the user where the next input will be inserted.

Figure 9:
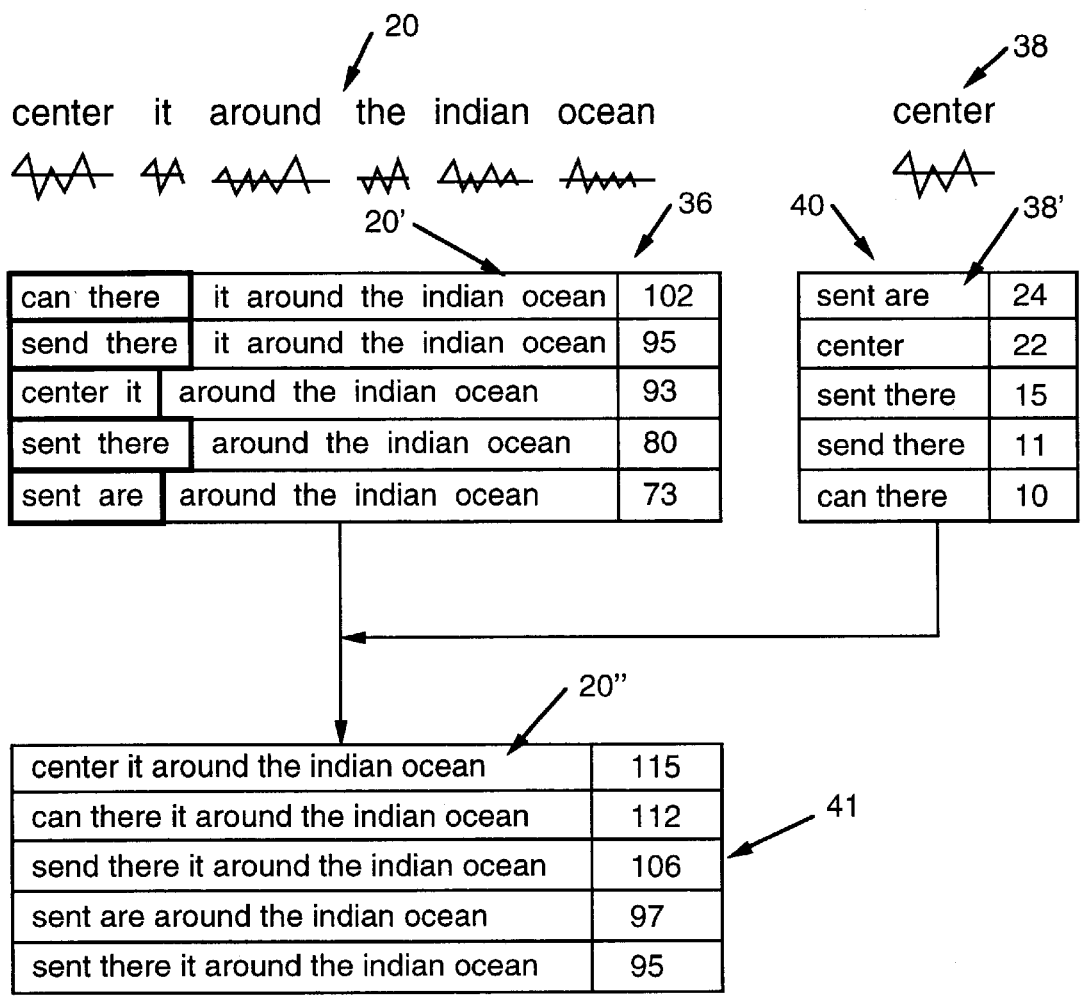
FIG. 9 illustrates the repair paradigm of the present invention in the context of a recognition engine which produces an n-best list or a lattice.

FIG. 9 shows an example of unimodal repair with correlation used by the correction and repair module 12 in the context of a speech recognition engine that produces an n-best list. The speaker first utters the primary utterance 20. The top (best) hypothesis in a primary recognition 36 is designated as 20'. If an error (as shown by the dotted box around the words "can there" in utterance 20') occurs, the speaker respeaks, or inputs information in some other manner such as spelling, writing, etc., the erroneous subsection of the primary utterance 20. In FIG. 9, a secondary or repair utterance 38 is shown. The top hypothesis in a secondary recognition 40 is designated as utterance 38'. The secondary utterance 38 is recognized using a language model constructed separately for the repair as discussed more fully below. The results of both recognitions 36 and 40 are then used to locate and/or repair the original error such that utterance 20" is the same as primary utterance 20 as shown in recognition 41.

Figure 10:
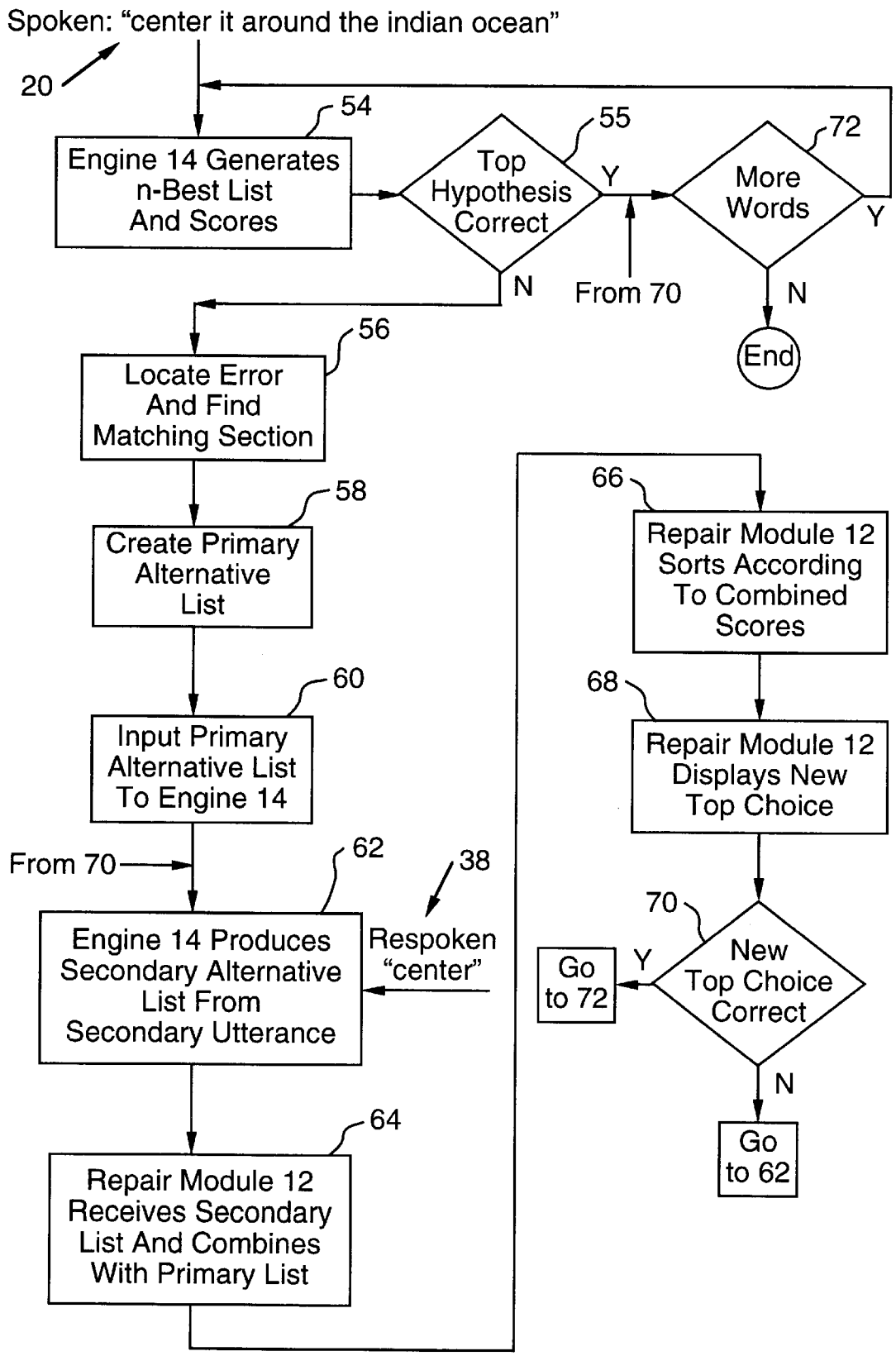
FIG. 10 is a flow chart illustrating the steps of one method performed by the speech recognition system illustrated in FIG. 1 of repairing machine-recognized speech, in the context of a recognition engine which produces an n-best list or a lattice, based on the error being respoken.

FIG. 10 illustrates the steps of one method of performing the unimodal repair illustrated in FIG. 9. In FIG. 10, when primary utterance 20 is spoken, speech recognition engine 14 produces at step 54 the primary recognition, which is shown in FIG. 9 as 36. The primary n-best list may be of the following type:

1. can there it around the indian ocean (score 102)
2. send there it around the indian ocean (score 95)
3. center it around the indian ocean (score 93)
4. sent there around the indian ocean (score 80)
5. sent are around the indian ocean (score 73)

The primary n-best list is the input to the correction and repair module 12. If, at step 55, it is determined that the top hypothesis is correct, then speech recognition may continue if more words are to be recognized as shown by decision step 72. If the top hypothesis is not correct, then the system goes into a repair mode as shown by the "No" branch coming from step 55.

At step 56, the errorful sections in the hypothesis with the highest score are located. Error locating can be performed in several ways, as has been described. After the errorful section has been located, the repair module 12 finds the matching section in each hypothesis as follows:

1. [can there] it around the indian ocean (score 102)
2. [send there] it around the indian ocean (score 95)
3. [center] it around the indian ocean (score 93)
4. [sent there] around the indian ocean (score 80)
5. [sent are] around the indian ocean (score 73)

At step 58, repair module 12 extracts the score for subsections of each hypothesis by adding the word scores. That creates a primary alternative list as follows:

1. [can there] (score 23)
2. [send there] (score 20)
3. [center] (score 19)
4. [sent there] (score 17)
5. [sent are] (score 14)

At step 60, repair module 12 sends control signals to speech recognition engine 14 to constrain engine 14 to recognize only the word sequences in the primary alternative list in the secondary utterance 38. Speech recognition engine 14 then produces, at step 62, a secondary alternative list from the secondary utterance:

1. [sent are] (score 24)
2. [center] (score 22)
3. [sent there] (score 15)
4. [send there] (score 11)
5. [can there] (score 10)

The secondary alternative list is input to the repair module 14, as shown by step 64, which adds scores from the primary alternative list and the secondary alternative list:

[can there] 23+10=33
[send there] 20+11=31
[center] 19+22=41
[sent there] 17+15=32
[sent are] 14+24=38

At step 66, the module 12 sorts according to the new summed score:

[center] 19+22=41
[sent are] 14+24=38
[can there] 23+10=33
[sent there] 17+15=32
[send there] 20+11=31

At step 68, repair module 12 replaces the highlighted section with the new top-choice, displays it, prints it, etc. as the corrected hypothesis:

[center] it around the indian ocean

At step 70, the user decides if the new top choice is correct. If yes, the process proceeds with decision step 72. If the new top choice is not correct, the process returns to step 62 where the secondary utterance is respoken.

The advantage of the method of the present invention is that the information learned from the primary utterance is combined with the information learned from the secondary utterance to improve the probability that the new top choice is correct. In prior art systems, the secondary utterance is treated as an independent event such that the probability that the secondary utterance will be recognized correctly is no greater than the probability that the primary utterance will be recognized correctly. However, in the present invention, by combining the weights from both the primary and secondary utterance, the probability is increased that the new top choice is correct. If a tertiary utterance is provided, the scores from the tertiary utterance are combined with those from the secondary and primary utterances to again increase the probability that the new top choice is correct.

It should be noted that although in the present example the scores are combined simply by addition, other types of combinations are possible. Additionally, it is possible to weight scores so that certain hypotheses are preferred. For example, one might presume that in a tertiary utterance, the speaker is at this point enunciating very clearly so that the hypotheses from the tertiary utterance would be given a greater weight than hypotheses from the primary utterance.

The process flow in FIG. 10 could be modified to substitute the spelling recognition engine 16 in place of the speech recognition engine 14 with respect to processing of the second utterance 38. Repairing a recognition with spelling is very similar to correction by speech. Again, given the location of an errorful section, a secondary utterance and search can be used to repair the primary recognition. In this case, the secondary utterance is a spelling of the correct words for the subsection that contained the error. That is, the process would be identical to the spoken repetition except that the primary alternative list created in step 58 would be formed into a sequence of letters:

1. [C A N T H E R E] (Score 23)
2. [S E N D T H E R E] (Score 20)
3. [C E N T E R] (Score 19)
4. [S E N T T H E R E] (Score 17)
5. [S E N T A R E] (Score 14)

In step 60, the repair module 12 sends control signals to spelling recognition engine 16 to constrain it to recognize only the letter sequences in the primary alternative list set forth above. Now, spelling recognition engine 16 receives a secondary utterance 38 which is spelled "C E N T E R". Spelling recognition engine 16 produces the following secondary alternative list from the spelled secondary utterance:

1. [C E N T E R] (Score 24)
2. [S E N T A R E] (Score 22)
3. [C A N T H E R E] (Score 17)
4. [S E N T T H E R E] (Score 15)
5. [S E N D T H E R E] (Score 11)

Thereafter, the repair module, at step 64, adds the scores as before and the remainder of the process is carried out in the same fashion.

Yet another way for the process of FIG. 10 to be expanded is to use as recognition engine 18 a handwriting recognition engine in combination with the input device 24. Given an incorrect section which has been highlighted as in step 56, a handwriting recognizer can also be constrained by the repair module 12 to only recognize and score the words or sequences from the primary alternative list. The repair module can then take the scored n-best list from the handwriting recognition engine 18 and combine those scores with the primary alternative list as discussed above.

Building upon the foregoing, the apparatus and method of the present invention can be extended to allow the user to correct the original recognition by uttering a paraphrase. Such a method is set forth in FIG. 11.

Figure 11:
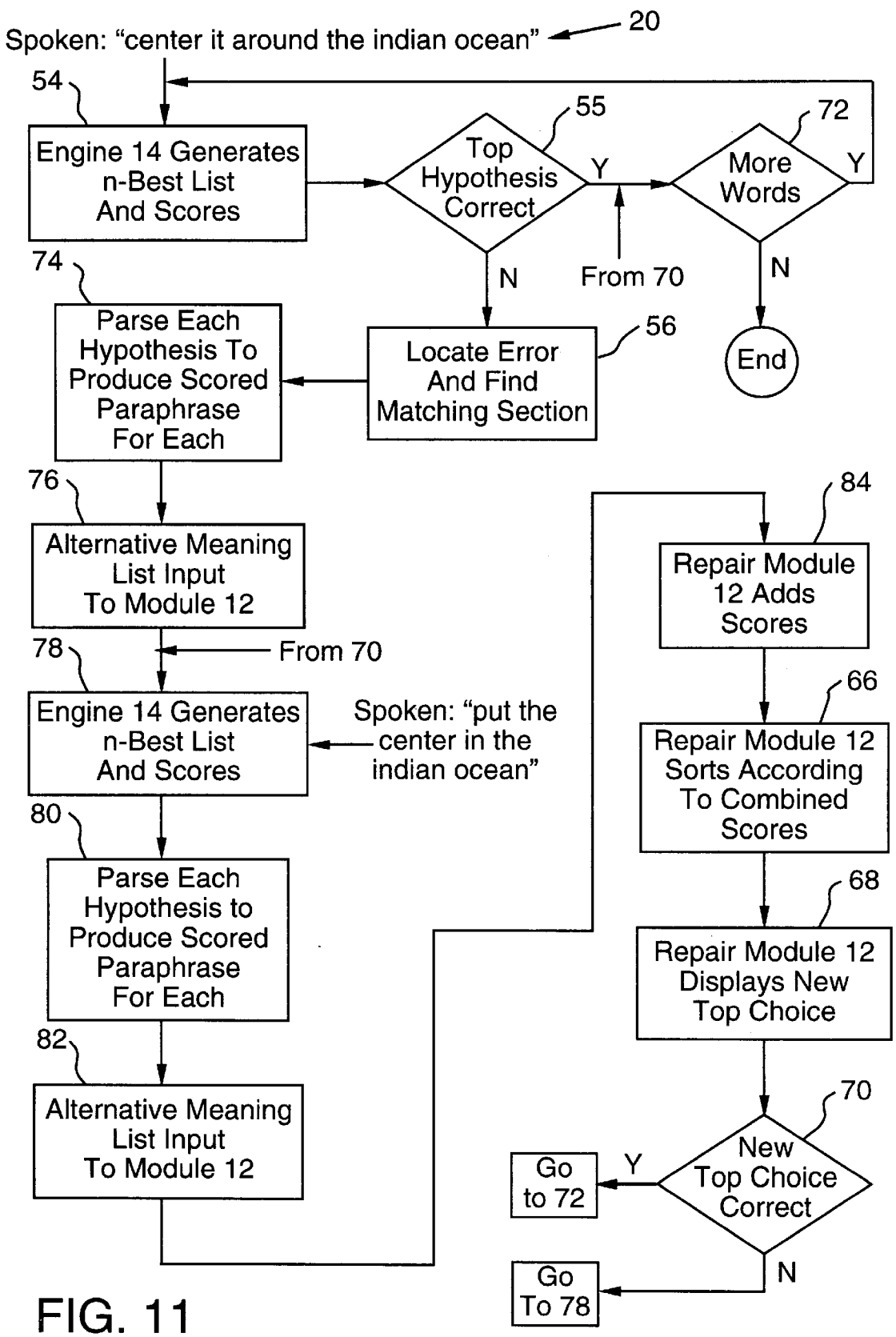
FIG. 11 is a flow chart illustrating the steps of another method performed by the speech recognition system illustrated in FIG. 1 of repairing machine-recognized speech, in the context of a recognition engine which produces an n-best list or lattice, based on a paraphrase of the error being spoken.

In FIG. 11, the original utterance 20 is spoken. As in the previous examples, the speech recognition engine 14 generates, at step 54, the n-best list:

1. can there it around the indian ocean (score 102)
2. send there it around the indian ocean (score 95)
3. center it around the indian ocean (score 93)
4. sent there around the indian ocean (score 80)
5. sent are around the indian ocean (score 73)

If the top hypothesis is correct as determined at step 55, the engine 14 is free to continue to recognize speech. However, if the top hypothesis is not correct. The error is located and the matching section found at step 56. Each hypothesis in the n-best list is sent through a parser which produces, at step 74, a scored paraphrase for each. Any paraphrases which are the same are combined. That produces an alternative meaning list of the following type which is input to the repair module 12 at step 76.

1. is it near the indian ocean (score 1020)
2. send it near the indian ocean (score 950)
3. move the center to the indian ocean (score 930)
4&5. it was sent to the indian ocean (score 800)

The user speaks a paraphrase of the correct meaning, "Put the center in the Indian Ocean." The recognition engine 14 is run on this utterance, at step 78, producing a second scored n-best list:

1. but the center in the indian ocean (score 150)
2. put the center in the indian ocean (score 148)
3. but the center is the indian ocean (score 130)
4. gut the center in the indian ocean (score 121)
5. put was sent where in the indian ocean (score 110)

The second n-best list is parsed at step 80 into the following second paraphrase list, which is input to the repair module 12 at step 82:

1. the center is in the indian ocean (score 1500)
2. move the center to the indian ocean (score 1480)
3. the indian ocean is the center (score 1300)
4. remove the contents of the center in the indian ocean (score 1210)
5. where in the indian ocean was it sent (score 1100)

The repair module 12 combines the first and second paraphrase lists in step 84 by adding scores for paraphrases that appear in both lists (shown here sorted):

1. move the center to the indian ocean (score 2500)
2. the center is in the indian ocean (score 1500)
3. the indian ocean is the center (score 1300)
4. remove the contents of the center in the indian ocean (score 1210)

5. where in the indian ocean was it sent (score 1100)

6. is it near the indian ocean (score 1020)

7. it was sent to the indian ocean (score 800)

Thereafter, the process is the same as the process shown in FIG. 10 with the repair module 12 sorting according to the combined scores, displaying the new top choice, etc.

Thus it is seen that the correction and repair method of the present invention can be used with a variety of processes for identifying the error to be corrected. Furthermore, the method and apparatus of the present invention can be used with a wide variety of techniques for developing information to correct the machine recognized input such as speech to speech correction, speech to spelling correction, and speech to writing correction. One common thread through all of these embodiments is that the secondary input signal, although independent of the primary input signal, is not treated as an independent event. As will be seen from the experimental data set forth below, the best results may be achieved when the secondary input signal takes a different form than the primary input signal, i.e., speech to spelling or speech to writing, such that the effects of accents and mistakes in enunciation can be minimized.

Test Results

As previously discussed, merely replacing the errorful sub-section with the top hypothesis from the secondary recognition means that all of the subpiece order information from the n-best list is unused. In the experiments, we made use of that information by implementing a method according to the present invention which restores and reorders the secondary recognition list by averaging the scores from the secondary recognition list with scores of identical subpieces in the primary recognition list.

The U. S. Government defined Resource Management task was used for our experiments. The specific set of utterances chosen consisted of all the male utterances from the February and October 1989 official test data. That included 390 utterances, in which were 300 unique sentences.

In experiment 1, the original speakers' utterances were used as the primary utterance and, in those cases where recognition errors occurred, a separate speaker recorded both the respoken and spelled repair utterances.

In experiment 2, the same speaker spoke all 390 primary utterances as well as the respoken repair utterances for those primary utterances that were misrecognized. For those experiments, the continuous speech recognition engine 14 was run in a sub-optimal mode to generate more errorful tokens over our test database.

Table 1 shows the primary recognition accuracies for the continuous speech recognition engine 14 in both experiments. Table 1 also shows the success of the automatic subpiece location method, and how often the correct replacement for an errorful subpiece was in the n-best list (N=50). Using the automatic subpiece location method disclosed herein, there is some possibility that no subpiece will be found because wordpair language models are not strong enough to guarantee that result. A finite state grammar to constrain the search would be able to guarantee that only exact substrings are produced. However, in the experiments reported here, wordpair models were found to be sufficient, always producing some subpiece within the first five secondary recognition hypotheses.

There is also the problem that there might be multiple, identical subpieces in the primary recognition first hypothesis. In that case, recognizing exactly what sequence of words was respoken is not enough to determine which of any identical sequences in the utterance was respoken. That problem would be most prevalent in commonly repetitive strings of numbers or letters. For the current experiments, the first matching subpiece (scanned in normal reading order) in the primary recognition hypothesis was used. Though other selection criteria could be used, that simple method was found to work well for a mostly non-repetitive resource management task. As might be expected, preliminary testing of this method showed that it works poorly if the subpiece to be located is only one or two short words. That problem, however, is not seen much in actual usage because humans tend to respeak a few words around the error to make it easier for other humans to locate the exact position in the utterance where the misrecognition occurred.

TABLE 1

Recognition Accuracies Before Repair

| Statistic | Experiment 1 | Experiment 2 |
| --- | --- | --- |
| Word Accuracy | 93.1% | 88.6% |
| Sentence Accuracy | 63.1% | 46.7% |
| Auto-Locate Success | 83.3% | 90.6% |
| Correct in n-best | 91.0% | 83.7% |

Table 2 shows the success rates for the various repair methods in both experiments. The column labeled "Highlight" reports the results when the errorful section was highlighted exactly by hand. The other column gives the results when the highlighting was with the automatic subpiece location method described above.

In our experiments, all the words are spelled together with no break for word boundaries. A string of words like "GET ME ANY" would be spoken as "G-E-T-M-E-A-N-Y". Again, a language model is created from the subpiece hypotheses in the same position as the errorful subsection in the primary n-best list. For spelling, that language model is a finite state grammar which completely restricts the output of the spelling recognition engine 16 to exact alternatives to the highlighted test, i.e., the spelling recognition engine 16 does not produce an n-best list or letter lattice. The subpiece that was recognized by the spelling recognition engine 16 is then used to replace the errorful subpiece in the original hypothesis.

Another method tried is to let the spelling recognition engine 16 do a free recognition (no language model), and then score each possible subpiece by the number of characters which differ from the recognized sequence. That gave a score for each subpiece which allowed the combination of scores from the spelling recognition engine 16 and the primary n-best list to come up with the best replacement subpiece.

In the experiments reported here, the language model used was a simple bigram model (no unseen wordpair probability) based only on the counts found in the appropriate subpieces of the n-best list. To find all the possible subpieces in the n-best list which were alternatives for the highlighted section of the best hypothesis, the start and end frames of the highlighted section were determined. In all other n-best hypotheses, the subpiece was chosen to include any words between or overlapping these start and end frames. Only unique substrings were used to determine the counts for the bigram language model. The original subpiece (known to contain at least one error) is also excluded from the language model data so that it cannot reoccur.

TABLE 2

Repair Method Success Rates

| Repair Method | Highlight | Auto-Locate |
|---|---|---|
| Exp. 1: Speak | 70.1% | 64.6% |
| Exp. 1: Spell | 82.6% | 70.8% |
| Exp. 1: Speak + Spell | 84.0% | 73.6% |
| Exp. 2: Speak | 67.4% | 62.7% |

Table 3 shows the improvements in overall sentence accuracy when using the separate and combined repair mechanisms with pre-highlighted error regions.

TABLE 3

Improvement of Sentence Accuracy

| Repair Method | Sentence Accuracy |
|---|---|
| None (baseline) | 63.1% |
| Speak | 83.8% |
| Spell | 88.5% |
| Speak + Spell | 89.0% |

The assumption that the correct transcription for the subpiece must be in the n-best list somewhere definitely restricts the possible situations that can be repaired although, for our speech recognition system 10, with 50 hypotheses in each n-best list, the correct subpiece was contained in the n-best list about 85% of the time overall. Increasing "n" would increase the likelihood of the correct alternative existing in the n-best list and should increase the repair success rates further. The results presented indicate that correlating the primary hypothesis with a respeaking or spelling of a misrecognized subsection of an utterance can be an effective way of repairing more than two thirds of recognition errors.

A second set of experiments was designed to evaluate the effectiveness of cross-modal repair. In all experiments, subjects were instructed to provide primary input as continuous speech. If recognition errors occurred, they could repair using speech, verbal spelling, handwriting or gestures.

In experiment 3, we used the continuous speech recognition engine as described in B. Suhm et al., "JANUS: Towards Multi-Lingual Spoken Language Translation", Proc. ARPA Spoken Language Technology Workshop 1995, Austin, Tex., pp. 221–226 in the version for the English spontaneous Scheduling Task (ESSTS). The vocabulary size is about 1000 words. In each session, two subjects were given fictitious calendars and were asked to schedule a meeting.

In experiment 4, we adapted our Wall Street Journal continuous speech recognizer Rogina, I. et al., "The Janus Speech Recognizer", in Proceeding of the Spoken Language Systems Technology Workshop (SLT), January 1995, Austin, Tex., p. 166–169 to recognize spoken utterances meant to fill information in fields containing day and time, first and last name and phone number, and location (city and state), respectively. The vocabulary sizes vary between 100 and 1,500 words.

In experiment 5, we used a sub-optimal version of our Wall Street Journal continuous speech recognizer with a 5,000 word vocabulary, and a 20,000 word vocabulary for both the spelling and handwriting recognition engines.

Tables 4–6 show the recognition accuracy for the primary input (which is continuous speech), and the repair method success rates for different modalities.

The results support he following claims made earlier in the description of the preferred embodiment: error correction methods of current art (n-best selection and respeak without correlation) are not very effective, whereas cross-modal repair as proposed in the teaching of this invention is significantly more accurate.

TABLE 4

Cross-Modal Repair on English Scheduling Task (4 subjects)

| | Primary Utterance | Respeak | Spelling | Handwrite | N-beset |
|---|---|---|---|---|---|
| Word Accuracy | 78% | 58% | 93% | 85% | 9% |
| # Words in Reference | 484 | 92 | 15 | 20 | 82 |

TABLE 5

Cross-Modal Repair on Form Filling Task (1 subject)

| | Primary Utterance | Respeak | Spelling | Handwrite | N-best |
|---|---|---|---|---|---|
| Word Accuracy | 81% | 50% | 89% | 86% | 0% |
| # Words in Reference | 279 | 16 | 9 | 21 | 25 |

TABLE 6

Cross-Modal Repair on Dictation Task (3 Subjects)

| | Primary Utterance | Respeak | Spelling | Handwrite | N-best |
|---|---|---|---|---|---|
| Word Accuracy | 51% | 0% | 81% | 64% | 12% |
| # Words in Reference | 351 | 128 | 41 | 102 | 90 |

It is anticipated that the present invention will be implemented primarily in software which will receive input signals from various devices and produce output signals for display, printing, or storage. The software may be divided into two modules. A first module could be the software needed to implement the various types of recognition engines as described in the various articles cited above, which are all hereby incorporate by reference. The second module could be a software interface between the hardware input/output devices and the first module. An example of such a software interface is found in Appendix A. The software interface in Appendix A operates in conjunction with a JANUS-SR speech recognition engine, Version 3.0b, (c) 1993–96 from Interactive Systems Labs, an NSpell connected letters spelling engine, by Hermann Hild 1996, (c) 1996 Interactive Systems Labs, and an NP++ handwriting recognition engine by Stefan Manke 1996, (c) Interactive Systems Labs.

The disclosed specific software, i.e., specific program code segments, may be employed to configure a general purpose microprocessor to create specific logic circuits. Those circuits are indicated to be certain of the "means", if any, found in the claims. The software of the present invention may be carried by any appropriate media such as, for example, tape, floppy disc, CD ROM, etc.

While the present invention has been described in conjunction with preferred embodiments thereof, those of ordinary skill in the art will recognize that many modifications and variations may be implemented. The present disclosure and the following claims are intended to encompass all such modifications and variations.

What is claimed is:

1. A method of repairing the output from a recognition engine generating at least one recognition hypothesis from a primary input signal including an utterance, comprising:

locating an error within the recognition hypothesis;

generating a repair hypothesis for said located error from a secondary input signal including a paraphrasing of at least a portion of the utterance;

correlating at least a portion of the recognition hypothesis with said repair hypothesis to produce a new hypothesis; and replacing said located error with the new hypothesis.

2. The method of claim 1 additionally comprising repeating the method in the event that the new hypothesis is incorrect.

3. The method of claim 1 wherein locating an error includes highlighting the error by using a pointing device.

4. The method of claim 1 wherein locating an error includes highlighting the error by using a keyboard.

5. The method of claim 1 wherein locating an error includes speaking the portion that is in error.

6. The method of claim 1 additionally comprising constraining the generation of said repair hypothesis to exclude known incorrect hypotheses.

7. The method of claim 1 wherein correlating at least a portion of the recognition hypotheses includes correlating said repair hypothesis with the context of at least a portion of said recognition hypothesis.

8. The method of claim 1 wherein correlating at least a portion of the recognition hypothesis includes correlating an n-best list of said repair hypothesis with an n-best list of at least a portion of said recognition hypothesis.

9. The method of claim 1 wherein correlating at least a portion of the recognition hypothesis includes correlating a lattice of said repair hypothesis with a lattice of at least a portion of said recognition hypothesis.

10. A method of repairing the output from a recognition engine generating at least one recognition hypothesis from a primary input signal including a writing, comprising:

locating an error within the recognition hypothesis;

generating a repair hypothesis for said located error from a secondary input signal including a paraphrasing of at least a portion of the writing;

correlating at least a portion of the recognition hypothesis with said repair hypothesis to produce a new hypothesis; and replacing said located error with the new hypothesis.

11. The method of claim 10 additionally comprising repeating the method in the event that the new hypothesis is incorrect.

12. The method of claim 10 wherein locating an error includes highlighting the error by using a pointing device.

13. The method of claim 10 wherein locating an error includes highlighting the error by using a keyboard.

14. The method of claim 10 wherein locating an error includes speaking the portion that is in error.

15. The method of claim 10 additionally comprising constraining the generation of said repair hypothesis to exclude known incorrect hypotheses.

16. The method of claim 10 wherein correlating at least a portion of the recognition hypothesis includes correlating said repair hypothesis with the context of at least a portion of said recognition hypothesis.

17. The method of claim 10 wherein correlating at least a portion of the recognition hypothesis includes correlating an n-best list of said repair hypothesis with an n-best list of at least a portion of said recognition hypothesis.

18. The method of claim 10 wherein correlating at least a portion of the recognition hypothesis includes correlating a lattice of said repair hypothesis with a lattice of at least a portion of said recognition hypothesis.

19. A method of repairing the output from a recognition engine generating at least one recognition hypothesis from a primary input signal including a verbal spelling, comprising:

locating an error within the recognition hypothesis;

generating a repair hypothesis for said located error from a secondary input signal including a paraphrasing of at least a portion of the verbal spelling;

correlating at least a portion of the recognition hypothesis with said repair hypothesis to produce a new hypothesis; and replacing said located error with the new hypothesis.

20. The method of claim 19 additionally comprising repeating the method in the event that the new hypothesis is incorrect.

21. The method of claim 19 wherein locating an error includes highlighting the error by using a pointing device.

22. The method of claim 19 wherein locating an error includes highlighting the error by using a keyboard.

23. The method of claim 19 wherein locating an error includes speaking the portion that is in error.

24. The method of claim 19 additionally comprising constraining the generation of said repair hypothesis to exclude known incorrect hypotheses.

25. The method of claim 19 wherein correlating at least a portion of the recognition hypothesis includes correlating said repair hypothesis with the context of at least a portion of said recognition hypothesis.

26. The method of claim 19 wherein correlating at least a portion of the recognition hypothesis includes correlating an n-best list of said repair hypothesis with an n-best list of at least a portion of said recognition hypothesis.

27. The method of claim 19 wherein correlating at least a portion of the recognition hypothesis includes correlating a lattice of said repair hypothesis with a lattice of at least a portion of said recognition hypothesis.

28. A method of repairing the output from a recognition engine generating at least one recognition hypothesis from a primary input signal, comprising:

locating an error within the recognition hypothesis, wherein locating an error includes speaking the portion that is in error;

generating a repair hypothesis for said located error from a secondary input signal;

correlating at least a portion of the recognition hypothesis with said repair hypothesis to produce a new hypothesis; and replacing said located error with the new hypothesis.

29. The method of claim 28 wherein the primary input signal includes an utterance and wherein generating a repair hypothesis from a secondary input signal includes generating a repair hypothesis from a respeaking of at least a portion of the utterance.

30. The method of claim 28 wherein the primary input signal includes an utterance and wherein generating a repair hypothesis from a secondary input signal includes generating a repair hypothesis from a verbal spelling of at least a portion of the utterance.

31. The method of claim 28 wherein the primary input signal includes an utterance and wherein generating a repair hypothesis from a secondary input signal includes generating a repair hypothesis from a non-verbal spelling of at least a portion of the utterance.

32. The method of claim 28 wherein the primary input signal includes an utterance and wherein generating a repair hypothesis from a secondary input signal includes generating a repair hypothesis from a writing of at least a portion of the utterance.

33. The method of claim 28 wherein the primary input signal includes an utterance and wherein generating a repair hypothesis from a secondary input signal includes generating a repair hypothesis from a paraphrasing of at least a portion of the utterance.

34. The method of claim 28 wherein the primary input signal includes a writing and wherein generating a repair hypothesis from a secondary input signal includes generating a repair hypothesis from a speaking of at least a portion of the writing.

35. The method of claim 28 wherein the primary input signal includes a writing and wherein generating a repair hypothesis from a secondary input signal includes generating a repair hypothesis from a verbal spelling of at least a portion of the writing.

36. The method of claim 28 wherein the primary input signal includes a writing and wherein generating a repair hypothesis from a secondary input signal includes generating a repair hypothesis from a nonverbal spelling of at least a portion of the writing.

37. The method of claim 28 wherein the primary input signal includes a writing and wherein generating a repair hypothesis from a secondary input signal includes generating a repair hypothesis from a rewriting of at least a portion of the writing.

38. The method of claim 28 wherein the primary input signal includes a writing and wherein generating a repair hypothesis from a secondary input signal includes generating a repair hypothesis from a paraphrasing of at least a portion of the writing.

39. The method of claim 28 wherein the primary input signal includes a verbal spelling and wherein generating a repair hypothesis from a secondary input signal includes generating a repair hypothesis from a speaking of at least a portion of the verbal spelling.

40. The method of claim 28 wherein the primary input signal includes a verbal spelling and wherein generating a repair hypothesis from a secondary input signal includes generating a repair hypothesis from a verbal respelling of at least a portion of the verbal spelling.

41. The method of claim 28 wherein the primary input signal includes a verbal spelling and wherein generating a repair hypothesis from a secondary input signal includes generating a repair hypothesis from a non-verbal spelling of at least a portion of the verbal spelling.

42. The method of claim 28 wherein the primary input signal includes a verbal spelling and wherein generating a repair hypothesis from a secondary input signal includes generating a repair hypothesis from a writing of at least a portion of the verbal spelling.

43. The method of claim 28 wherein the primary input signal includes a verbal spelling and wherein generating a repair hypothesis from a secondary input signal includes generating a repair hypothesis from a paraphrasing of at least a portion of the verbal spelling.

44. The method of claim 28 additionally comprising repeating the method in the event that the new hypothesis is incorrect.

45. The method of claim 28 additionally comprising constraining the generation of said repair hypothesis to exclude known incorrect hypotheses.

46. The method of claim 28 wherein correlating at least a portion of the recognition hypothesis includes correlating said repair hypothesis with the context of at least a portion of said recognition hypothesis.

47. The method of claim 28 wherein correlating at least a portion of the recognition hypothesis includes correlating an n-best list of said repair hypothesis with an n-best list of at least a portion of said recognition hypothesis.

48. The method of claim 28 wherein correlating at least a portion of the recognition hypothesis includes correlating a lattice of said repair hypothesis with a lattice of at least a portion of said recognition hypothesis.

49. A method of repairing the output from a recognition engine generating at least one recognition hypothesis from a primary input signal including a utterance comprising:

locating an error within the recognition hypothesis:

generating a repair hypothesis for said located error from a secondary input signal of different modality than the primary input signal, said secondary input signal including a paraphrasing of at least a portion of the utterance; and replacing said located error with the repair hypothesis.

50. The method of claim 49 additionally comprising repeating the method in the event that the new hypothesis is incorrect.

51. The method of claim 49 wherein locating an error includes highlighting the error by using a pointing device.

52. The method of claim 49 wherein locating an error includes highlighting the error by using a keyboard.

53. The method of claim 49 wherein locating an error includes speaking the portion that is in error.

54. The method of claim 49 additionally comprising correlating at least a portion of the recognition hypothesis with said repair hypothesis to produce a new hypothesis, and wherein said new hypothesis is used to replace said located error instead of the repair hypothesis.

55. The method of claim 54 wherein correlating at least a portion of the recognition hypothesis includes correlating said repair hypothesis with the context of at least a portion of said recognition hypothesis.

56. The method of claim 54 wherein correlating at least a portion of the recognition hypothesis includes correlating an n-best list of said repair hypothesis with an n-best list of at least a portion of said recognition hypothesis.

57. The method of claim 54 wherein correlating at least a portion of the recognition hypothesis includes correlating a lattice of said repair hypothesis with a lattice of at least a portion of said recognition hypothesis.

58. The method of claim 49 additionally comprising constraining the generation of said repair hypothesis to exclude known incorrect hypotheses.

59. A method of repairing the output from a recognition engine generating at least one recognition hypothesis from a primary input signal including a writing, comprising:

locating an error within the recognition hypothesis:

generating a repair hypothesis for said located error from a secondary input signal of a different modality than the primary input signal, said secondary input signal including paraphrasing of at least a portion of the writing; and replacing said located error with the repair hypothesis.

60. The method of claim 59 additionally comprising repeating the method in the event that the new hypothesis is incorrect.

61. The method of claim 59 wherein locating an error includes highlighting the error by using a pointing device.

62. The method of claim 59 wherein locating an error includes highlighting the error by using a keyboard.

63. The method of claim 59 wherein locating an error includes speaking the portion that is in error.

64. The method of claim 59 additionally comprising correlating at least a portion of the recognition hypothesis with said repair hypothesis to produce a new hypothesis, and wherein said new hypothesis is used to replace said located error instead of the repair hypothesis.

65. The method of claim 64 wherein correlating at least a portion of the recognition hypothesis includes correlating said repair hypothesis with the context of at least a portion of said recognition hypothesis.

66. The method of claim 64 wherein correlating at least a portion of the recognition hypothesis includes correlating an n-best list of said repair hypothesis with an n-best list of at least a portion of said recognition hypothesis.

67. The method of claim 64 wherein correlating at least a portion of the recognition hypothesis includes correlating a lattice of said repair hypothesis with a lattice of at least a portion of said recognition hypothesis.

68. The method of claim 59 additionally comprising constraining the generation of said repair hypothesis to exclude known incorrect hypotheses.

69. A method of repairing the output from a recognition engine generating at least one recognition hypothesis from a primary input signal including a verbal spelling, comprising:

locating an error within the recognition hypothesis:

generating a repair hypothesis for said located error from a secondary input signal of a different modality than the primary input signal, said secondary input signal including a paraphrasing of at least a portion of the verbal spelling; and replacing said located error with the repair hypothesis.

70. The method of claim 69 additionally comprising repeating the method in the event that the new hypothesis is incorrect.

71. The method of claim 69 wherein locating an error includes highlighting the error by using a pointing device.

72. The method of claim 69 wherein locating an error includes highlighting the error by using a keyboard.

73. The method of claim 69 wherein locating an error includes speaking the portion that is in error.

74. The method of claim 69 additionally comprising correlating at least a portion of the recognition hypothesis with said repair hypothesis to produce a new hypothesis, and wherein said new hypothesis is used to replace said located error instead of the repair hypothesis.

75. The method of claim 74 wherein correlating at least a portion of the recognition hypothesis includes correlating said repair hypothesis with the context of at least a portion of said recognition hypothesis.

76. The method of claim 74 wherein correlating at least a portion of the recognition hypothesis includes correlating an n-best list of said repair hypothesis with an n-best list of at least a portion of said recognition hypothesis.

77. The method of claim 74 wherein correlating at least a portion of the recognition hypothesis includes correlating a lattice of said repair hypothesis with a lattice of at least a portion of said recognition hypothesis.

78. The method of claim 69 additionally comprising constraining the generation of said repair hypothesis to exclude known incorrect hypotheses.

79. A method of repairing the output from a recognition engine generating at least one recognition hypothesis from a primary input signal, comprising:

locating an error within the recognition hypothesis, wherein locating an error includes speaking the portion that is in error;

generating a repair hypothesis for said located error from a secondary input signal of a different modality than the primary input signal; and replacing said located error with the repair hypothesis.

80. The method of claim 79 wherein the primary input signal includes an utterance and wherein generating a repair hypothesis from a secondary input signal includes generating a repair hypothesis from a verbal spelling of at least a portion of the utterance.

81. The method of claim 79 wherein the primary input signal includes an utterance and wherein generating a repair hypothesis from a secondary input signal includes generating a repair hypothesis from a non-verbal spelling of at least a portion of the utterance.

82. The method of claim 79 wherein the primary input signal includes an utterance and wherein generating a repair hypothesis from a secondary input signal includes generating a repair hypothesis from a writing of at least a portion of the utterance.

83. The method of claim 79 wherein the primary input signal includes an utterance and wherein generating a repair hypothesis from a secondary input signal includes generating a repair hypothesis from a paraphrasing of at least a portion of the utterance.

84. The method of claim 79 wherein the primary input signal includes a writing and wherein said step of generating a repair hypothesis from a secondary input signal includes the step of generating a repair hypothesis from a speaking of at least a portion of the writing.

85. The method of claim 79 wherein the primary input signal includes a writing and wherein generating a repair hypothesis from a secondary input signal includes generating a repair hypothesis from a verbal spelling of at least a portion of the writing.

86. The method of claim 79 wherein the primary input signal includes a writing and wherein generating a repair hypothesis from a secondary input signal includes generating a repair hypothesis from a nonverbal spelling of at least a portion of the writing.

87. The method of claim 79 wherein the primary input signal includes a writing and wherein generating a repair hypothesis from a secondary input signal includes generating a repair hypothesis from a paraphrasing of at least a portion of the writing.

88. The method of claim 79 wherein the primary input signal includes a verbal spelling and wherein generating a repair hypothesis from a secondary input signal includes generating a repair hypothesis from a speaking of at least a portion of the verbal spelling.

89. The method of claim 79 wherein the primary input signal includes a verbal spelling and wherein generating a repair hypothesis from a secondary input signal includes generating a repair hypothesis from a non-verbal spelling of at least a portion of the verbal spelling.

90. The method of claim 79 wherein the primary input signal includes a verbal spelling and wherein generating a repair hypothesis from a secondary input signal includes generating a repair hypothesis from a writing of at least a portion of the verbal spelling.

91. The method of claim 79 wherein the primary input signal includes a verbal spelling and wherein generating a repair hypothesis from a secondary input signal includes generating a repair hypothesis from a paraphrasing of at least a portion of the verbal spelling.

92. The method of claim 79 additionally comprising repeating the method in the event that the repair hypothesis is incorrect.

93. The method of claim 79 additionally comprising correlating at least a portion of the recognition hypothesis with said repair hypothesis to produce a new hypothesis, and wherein said new hypothesis is used to replace said located error instead of the repair hypothesis.

94. The method of claim 93 wherein correlating at least a portion of the recognition hypothesis includes the step of correlating said repair hypothesis with the context of at least a portion of said recognition hypothesis.

95. The method of claim 93 wherein correlating at least a portion of the recognition hypothesis includes the step of correlating an n-best list of said repair hypothesis with an n-best list of at least a portion of said recognition hypothesis.

96. The method of claim 93 wherein correlating at least a portion of the recognition hypothesis includes correlating a lattice of said repair hypothesis with a lattice of at least a portion of said recognition hypothesis.

97. The method of claim 79 additionally comprising constraining the generation of said repair hypothesis to exclude known incorrect hypotheses.

98. An apparatus, comprising:
a recognition engine for generating at least one recognition hypothesis in response to a primary input signal including an utterance;
a location module for locating an error within said recognition hypothesis, said recognition engine generating a repair hypothesis for said located error in response to a secondary input signal including a paraphrasing of at least a portion of the utterance;
a replacement module for replacing said located error with said new hypothesis.

99. The apparatus of claim 98 additionally comprising a second recognition engine responsive to said secondary input signal for generating a repair hypothesis in place of the repair hypothesis being generated by said recognition engine.

100. An apparatus, comprising:
a recognition engine for generating at least one recognition hypothesis in response to a primary input signal including a writing;
a location module for locating an error within said recognition hypothesis, said recognition engine generating a repair hypothesis for said located error in response to a secondary input signal including a paraphrasing of at least a portion of the writing;
a correlation module for correlating at least a portion of said recognition hypothesis with said repair hypothesis to produce a new hypothesis; and
a replacement module for replacing said located error with said new hypothesis.

101. The apparatus of claim 100 additionally comprising a second recognition engine responsive to said secondary input signal for generating a repair hypothesis in place of the repair hypothesis being generated by said recognition engine.

102. An apparatus, comprising:
a recognition engine for generating at least one recognition hypothesis in response to a primary input signal including verbal spelling;
a location module for locating an error within said recognition hypothesis, said recognition engine generating a repair hypothesis for said located error in response to a secondary input signal including a paraphrasing of at least a portion of the verbal spelling;
a correlation module for correlating at least a portion of said recognition hypothesis with said repair hypothesis to produce a new hypothesis; and
a replacement module for replacing said located error with said new hypothesis.

103. The apparatus of claim 102 additionally comprising a second recognition engine responsive to said secondary input signal for generating a repair hypothesis in place of the repair hypothesis being generated by said recognition engine.

104. An apparatus, comprising:
a first recognition engine for generating at least one recognition hypothesis from a primary input signal including an utterance;
a location module for locating an error within said recognition hypothesis;
a second recognition engine for generating a repair hypothesis for said located error from a secondary input signal of a different modality than said primary input signal, said secondary input signal including a paraphrasing of at least a portion of the utterance; and
a replacement module for replacing said located error with said repair hypothesis.

105. The apparatus of claim 104 additionally comprising a correlation module for correlating at least a portion of said recognition hypothesis with said repair hypothesis to produce a new hypothesis.

106. An apparatus, comprising:
a first recognition engine for generating at least one recognition hypothesis from a primary input signal including a writing;
a location module for locating an error within said recognition hypothesis;
a second recognition engine for generating a repair hypothesis for said located error from a secondary input signal of a different modality than said primary input signal, said secondary input signal including a paraphrasing of at least a portion of the writing; and
a replacement module for replacing said located error with said repair hypothesis.

107. The apparatus of claim 106 additionally comprising a correlation module for correlating at least a portion of said recognition hypothesis with said repair hypothesis to produce a new hypothesis.

108. An apparatus, comprising:
a first recognition engine for generating at least one recognition hypothesis from a primary input signal including a verbal spelling;
a location module for locating an error within said recognition hypothesis;
a second recognition engine for generating a repair hypothesis for said located error from a secondary input signal of a different modality than said primary input signal, said secondary input signal including a paraphrasing of at least a portion of the verbal spelling; and
a replacement module for replacing said located error with said repair hypothesis.

109. The apparatus of claim 108 additionally comprising a correlation module for correlating at least a portion of said recognition hypothesis with said repair hypothesis to produce a new hypothesis.

110. An apparatus, comprising:
a recognition engine for generating at least one recognition hypothesis in response to a primary input signal;
a location module for locating an error within said recognition hypothesis in response to a speaking of the portion that is in error, said recognition engine generating a repair hypothesis for said located error in response to a secondary input signal;

a correlation module for correlating at least a portion of said recognition hypothesis with said repair hypothesis to produce a new hypothesis; and a replacement module for replacing said located error with said new hypothesis.

111. The apparatus of claim 110 additionally comprising a second recognition engine responsive to said secondary input signal for generating a repair hypothesis in place of the repair hypothesis being generated by said recognition engine.

112. An apparatus, comprising:

a first recognition engine for generating at least one recognition hypothesis from a primary input signal;

a location module for locating an error within said recognition hypothesis in response to a speaking of the portion that is in error;

a second recognition engine for generating a repair hypothesis for said located error from a secondary input signal of a different modality than said primary input signal; and a replacement module for replacing said located error with said repair hypothesis.

113. The apparatus of claim 112 additionally comprising a correlation module for correlating at least a portion of said recognition hypothesis with said repair hypothesis to produce a new hypothesis.

* * * * *